United States Patent [19]
Jibbe et al.

[11] Patent Number: 5,345,565
[45] Date of Patent: Sep. 6, 1994

[54] MULTIPLE CONFIGURATION DATA PATH ARCHITECTURE FOR A DISK ARRAY CONTROLLER

[75] Inventors: Mahmoud K. Jibbe; Craig C. McCombs; Kenneth J. Thompson, all of Wichita, Kans.

[73] Assignee: NCR Corporation, Dayton, Ohio

[21] Appl. No.: 668,660

[22] Filed: Mar. 13, 1991

[51] Int. Cl.$^5$ .............................................. G06F 11/10
[52] U.S. Cl. ................................... 395/325; 371/49.2; 371/10.1
[58] Field of Search .................. 395/325, 425, 275; 371/49.2, 10.1, 10.2, 40.1, 8.1

[56] References Cited

U.S. PATENT DOCUMENTS

| | | | |
|---|---|---|---|
| 4,494,196 | 1/1985 | Greer | 364/200 |
| 4,612,613 | 9/1986 | Gershenson et al. | 364/200 |
| 4,761,785 | 8/1988 | Clark et al. | 371/51 |
| 4,775,978 | 10/1988 | Hartness | 371/38 |
| 4,899,342 | 2/1990 | Potter et al. | 371/10.1 |
| 4,914,656 | 4/1990 | Dunphy, Jr. et al. | 371/10.2 |
| 4,958,351 | 9/1990 | Flora et al. | 371/40.1 |
| 5,088,081 | 2/1992 | Farr | 371/10.1 X |
| 5,124,987 | 6/1992 | Milligan et al. | 371/10.1 |
| 5,130,992 | 7/1992 | Frey, Jr. et al. | 371/40.1 |
| 5,140,592 | 8/1992 | Idleman et al. | 371/8.1 |
| 5,148,432 | 9/1992 | Gordon et al. | 371/10.1 |
| 5,206,943 | 4/1993 | Callison et al. | 395/425 |
| 5,208,813 | 5/1993 | Stallmo | 371/10.1 |

FOREIGN PATENT DOCUMENTS

294297A2 7/1988 European Pat. Off. ...... G06F 11/10
320107A3 6/1989 European Pat. Off. ...... G06F 11/10

OTHER PUBLICATIONS

"A Case for Redundant Arrays of Inexpensive Disks (RAID)" by David A. Patterson, et al., Computer Science Division (EECS) University of California, Report No. UCB/CSD 87/391, Dec. 1987.

"Parity Striping of Disc Arrays: Low-Cost Reliable Storage with Acceptable Throughput" Jim Gray, et al., Tandem Computers, Technical Report 90.2, Jan. 1990, Part No:39596.

Primary Examiner—Michael R. Fleming
Assistant Examiner—Glenn A. Auve
Attorney, Agent, or Firm—James M. Stover

[57] ABSTRACT

A disk array controller including a data path architecture which can be configured to perform data transfer operations between a host system and a plurality of disk drives configured as a RAID level 1, 3, 4 of 5 disk array. The data path architecture includes a plurality of array channels for coupling selected disk drives with a host system bus and circuitry for generating parity information during write operations. Each array channel includes a data bus connected through bus drivers to the host bus, its associated disk drive, and the input and output of the parity generation circuitry. The bus drivers control the placement of data unto the array busses and the direction of the data flow on the array busses. In addition to performing data transfer operations and generating parity information the data path architecture can be configured to check parity information, recover lost data, reconstruct disk drives, monitor data transfer operations, verify data transfer operations and broadcast information to several disk drives.

10 Claims, 23 Drawing Sheets

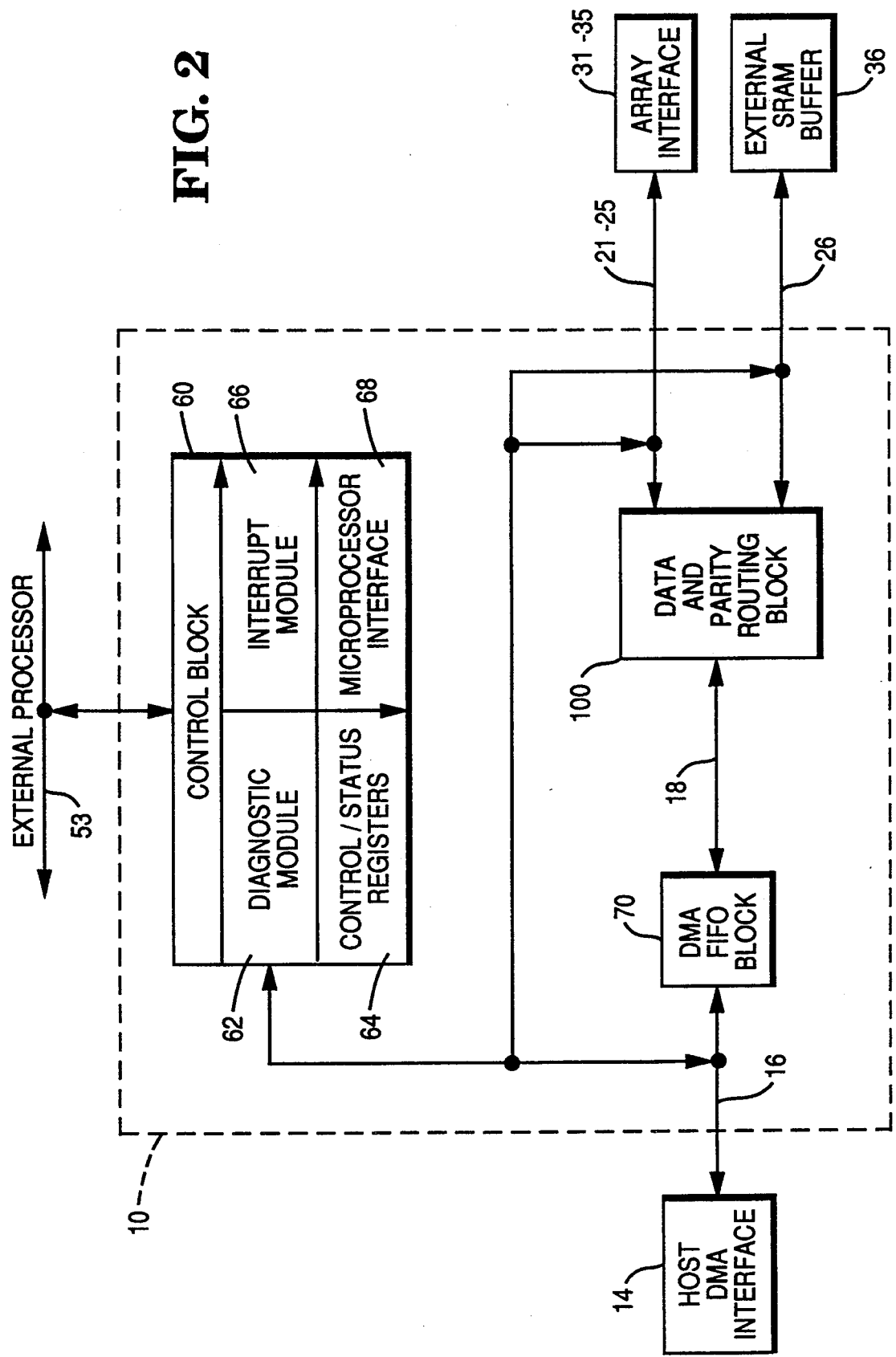

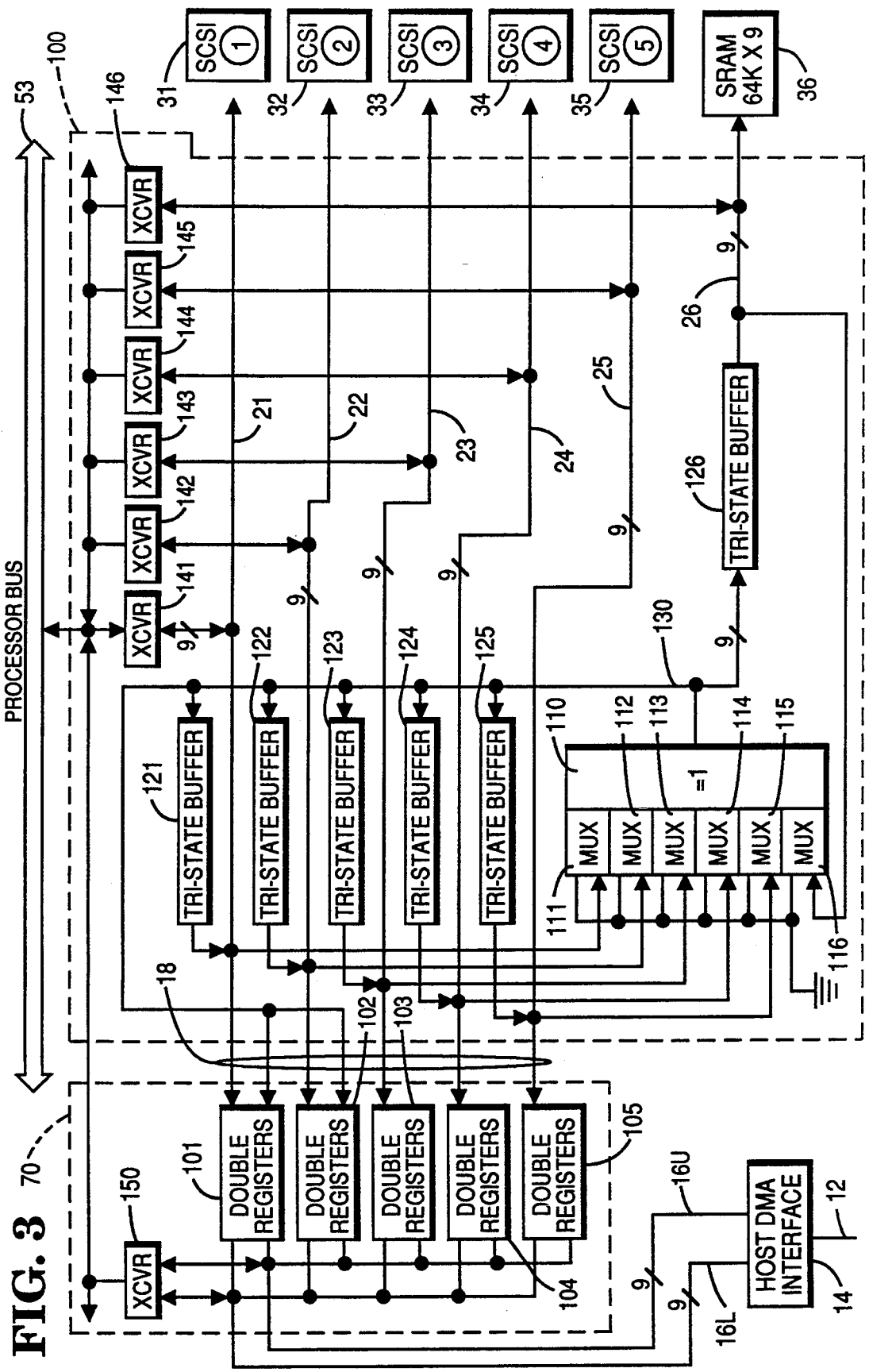

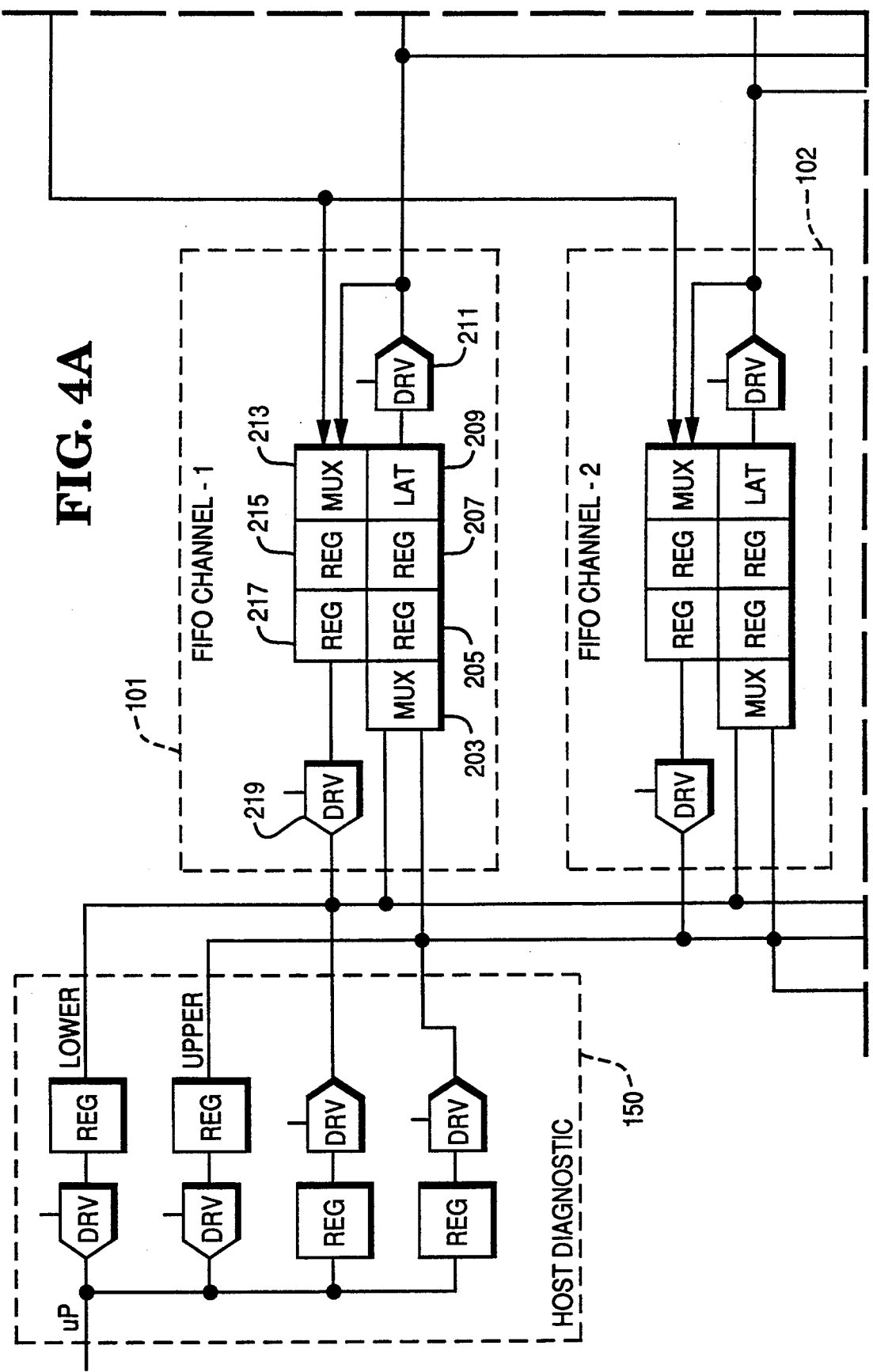

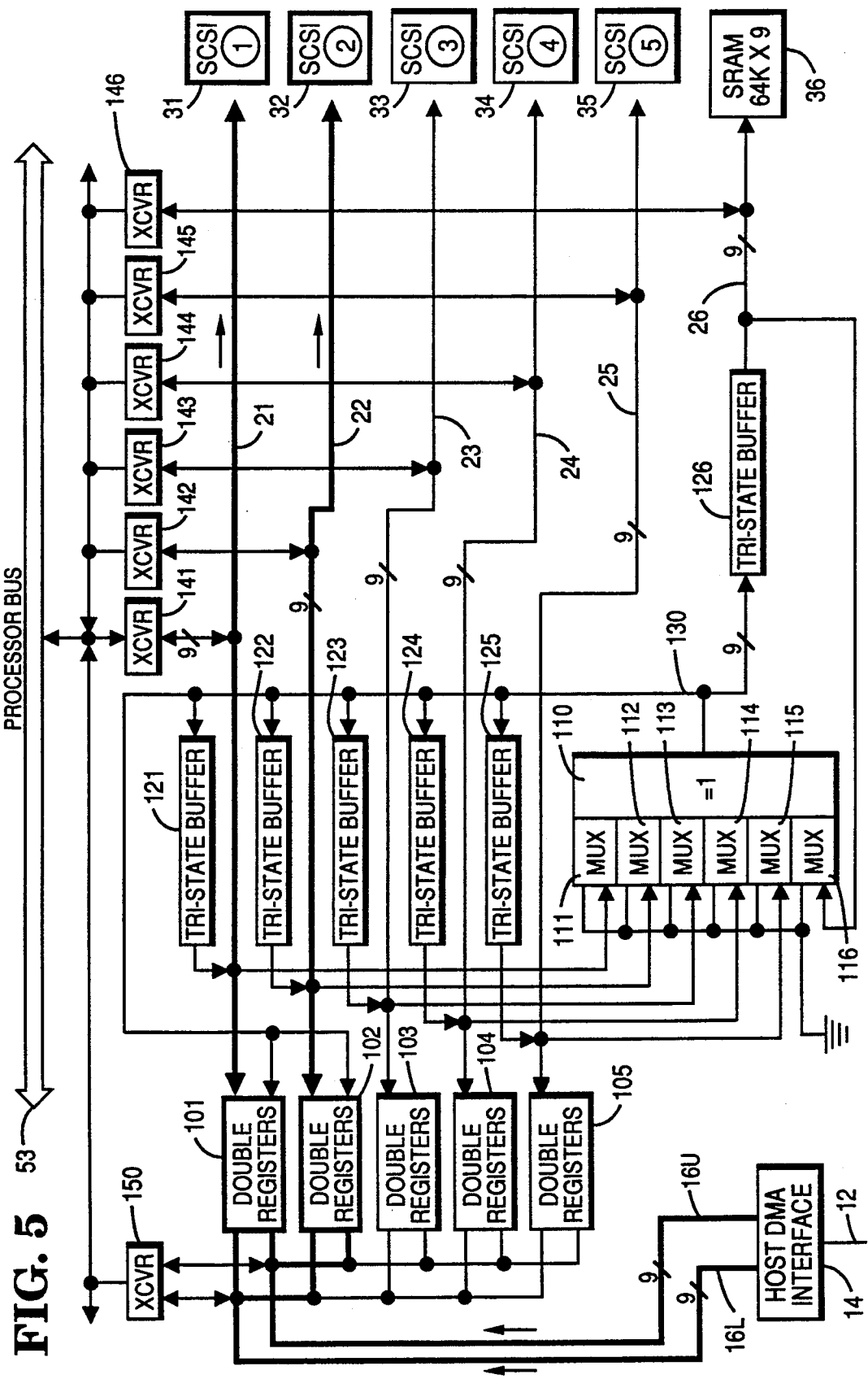

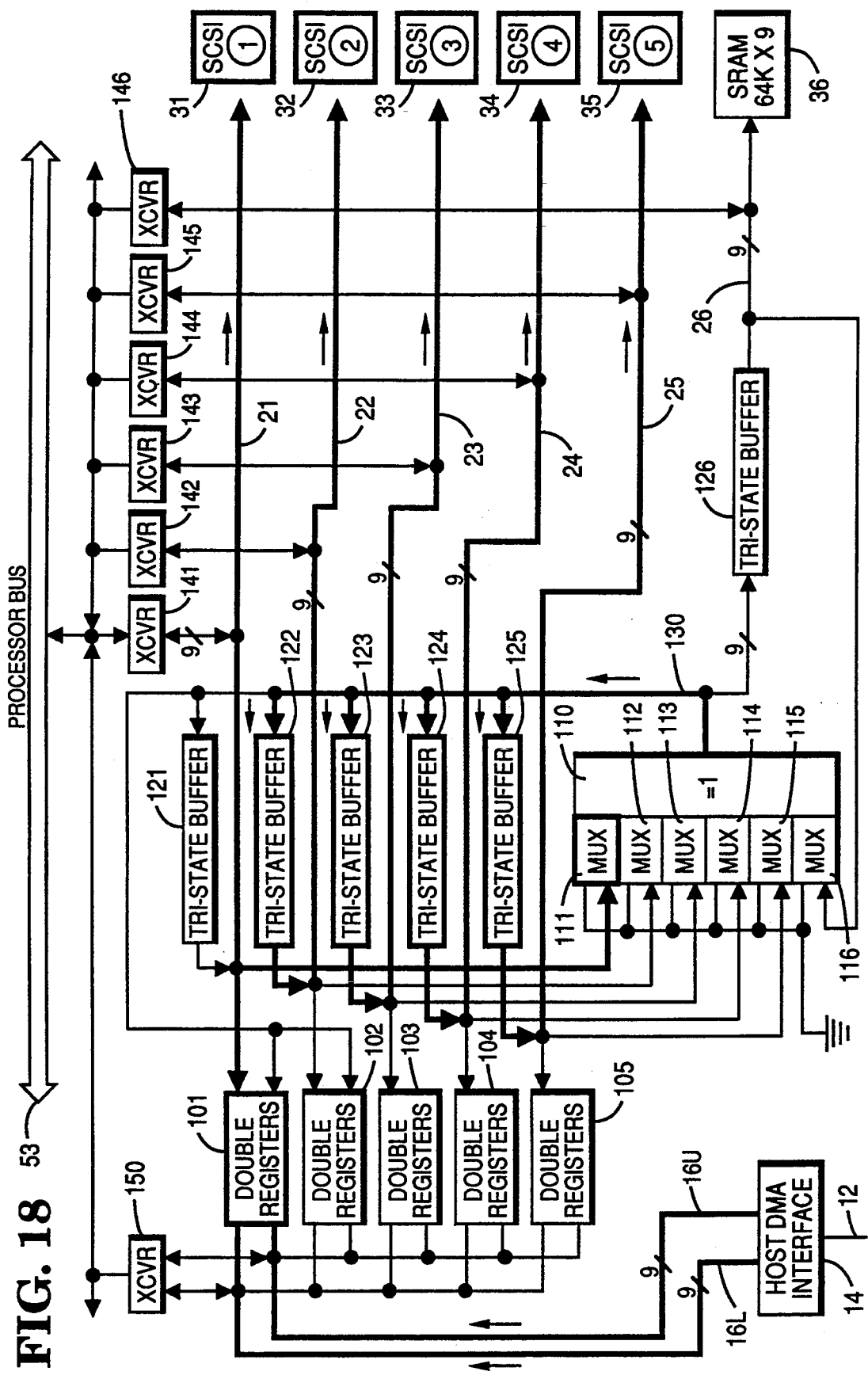

MULTIPLE CONFIGURATION DATA PATH ARCHITECTURE FOR A DISK ARRAY CONTROLLER

The present invention relates to disk storage devices for computer systems and, more particularly, to an I/O controller for an array of disk storage devices.

BACKGROUND OF THE INVENTION

Recent and continuing increases in computer processing power and speed, in the speed and capacity of primary memory, and in the size and complexity of computer software has resulted in the need for faster operating, larger capacity secondary memory storage devices; magnetic disks forming the most common external or secondary memory storage means utilized in present day computer systems. Unfortunately, the rate of improvement in the performance of large magnetic disks has not kept pace with processor and main memory performance improvements. However, significant secondary memory storage performance and cost improvements may be obtained by the replacement of single large expensive disk drives with a multiplicity of small, inexpensive disk drives interconnected in a parallel array, which to the host appears as a single large fast disk.

Several disk array design alternatives were presented in an article titled "A Case for Redundant Arrays of Inexpensive Disks (RAID)" by David A. Patterson, Garth Gibson and Randy H. Katz; University of California Report No. UCB/CSD 87/391, December 1987. The article, incorporated herein by reference, discusses disk arrays and the improvements in performance, reliability, power consumption and scalability that disk arrays provide in comparison to single large magnetic disks.

Five disk array arrangements, referred to as RAID levels, are described in the article. The first level RAID comprises N disks for storing data and N additional "mirror" disks for storing copies of the information written to the data disks. RAID level 1 write functions require that data be written to two disks, the second "mirror" disk receiving the same information provided to the first disk. When data is read, it can be read from either disk.

RAID level 3 systems comprise one or more groups of N+1 disks. Within each group, N disks are used to store data, and the additional disk is utilized to store parity information. During RAID level 3 write functions, each block of data is divided into N portions for storage among the N data disks. The corresponding parity information is written to a dedicated parity disk. When data is read, all N data disks must be accessed. The parity disk is used to reconstruct information in the event of a disk failure.

RAID level 4 systems are also comprised of one or more groups of N+1 disks wherein N disks are used to store data, and the additional disk is utilized to store parity information. RAID level 4 systems differ from RAID level 3 systems in that data to be saved is divided into larger portions, consisting of one or many blocks of data, for storage among the disks. Writes still require access to two disks, i.e., one of the N data disks and the parity disk. In a similar fashion, read operations typically need only access a single one of the N data disks, unless the data to be read exceeds the block length stored on each disk. As with RAID level 3 systems, the parity disk is used to reconstruct information in the event of a disk failure.

PAID level 5 is similar to RAID level 4 except that parity information, in addition to the data, is distributed across the N+1 disks in each group. Although each group contains N+1 disks, each disk includes some blocks for storing data and some blocks for storing parity information. Where parity information is stored is controlled by an algorithm implemented by the user. As in RAID level 4 systems, RAID level 5 writes require access to at least two disks; however, no longer does every write to a group require access to the same dedicated parity disk, as in RAID level 4 systems. This feature provides the opportunity to perform concurrent write operations.

An additional disk array arrangement, referred to as parity striping, is presented in an article titled "Parity Striping of Disc Arrays: Low-Cost Reliable Storage with Acceptable Throughput" by Jim Gray, Bob Horst and Mark Walker; Tandem Computers, Inc., Tandem Technical Report No. 90.2, January 1990. In the parity striping system, only parity information is distributed across the disks, and the parity is mapped as large contiguous extents. Data is not divided among the disks but is stored in the conventional manner.

In many of the disk array systems described in the prior art, the host operates as the RAID controller and performs the parity generation and checking. Having the host compute parity is expensive in host processing overhead. In addition, most systems include a fixed data path structure interconnecting the plurality of disk drives with the host system. Rearrangement of the disk array system to accommodate different quantities of disk drives or different RAID configurations is not easily accomplished.

A disk array controller providing parity generation and a variable data and parity path configuration for interconnecting the host system with the array disk drives is desired.

OBJECTS OF THE INVENTION

It is therefore an object of the present invention to provide a new and useful data routing architecture for interconnecting a host system with an array of disk drives.

It is another object of the present invention to provide such a data routing architecture which can be configured in various arrangements to support different RAID configurations.

It is yet another object of the present invention to provide such a data routing architecture which also includes parity generation, parity checking and parity routing.

It is still a further object of the present invention to provide a new and useful disk array controller for interfacing a disk array with a host system.

It is also an object of the present invention to provide such a disk array controller including parity generation and variable data and parity routing.

SUMMARY OF THE INVENTION

There is provided, in accordance with the present invention, a versatile data path architecture for coupling a host with an array of disk drives. The data path architecture includes a host bus, a plurality of array busses, and means for connecting the host bus with a first group of selected array busses. An exclusive-OR circuit is provided for generating and checking parity information. The data path architecture further includes means for connecting a second group of selected array busses to the input of the exclusive-OR circuit, and means for connecting the output of the exclusive-OR circuit to a third group of selected array busses.

In the embodiment set forth below, the data path architecture is described as including a plurality of "array channels" connecting corresponding disk drive units with the host bus and the exclusive-OR circuit. Each array channel includes an array bus; a register connected to the host bus for receiving data therefrom; a first bus driver connected between the register and the array bus and having an enable input connected to receive a first control signal, the first bus driver being responsive to the first control signal to provide the contents of the register to the array bus; a multiplexer having a first input connected to the array bus, a second input connected to a logic zero voltage source, an output connected to the exclusive-OR circuit and a select input connected to receive a second control signal, the multiplexer being responsive to the second control signal to connect the array bus with the exclusive-OR circuit; and a second bus driver connected between the output of the exclusive-OR circuit and the array bus and having an enable input connected to receive a third control signal, the second bus driver being responsive to the third control signal to provide the output of the exclusive-OR circuit to the array bus.

The described embodiment further includes additional structure providing for the temporary storage of data generated by the exclusive-OR circuit and structure for performing diagnostic operations.

The above and other objects, features, and advantages of the present invention will become apparent from the following detailed specification when read in conjunction with the accompanying drawings in which applicable reference numerals have been carried forward.

BRIEF DESCRIPTION OF THE DRAWINGS

FIG. 2 is a functional block diagram of the SCSI Array Data Path Chip (ADP) shown in FIG. 1 which incorporates the data and parity routing architecture of the present invention.

FIG. 3 is a block diagram of the DMA FIFO and routing blocks shown in FIG. 2, representing a preferred embodiment of the present invention.

FIGS. 4A through 4F provide a more detailed block diagram of the architecture shown in FIG. 3.

FIGS. 5 through 18 illustrate some of the various configurations of the circuit of FIG. 3. For example, FIG. 8 shows the circuit configuration for performing a RAID level 3 write operation.

DETAILED DESCRIPTION OF THE PREFERRED EMBODIMENT

Figure 1:
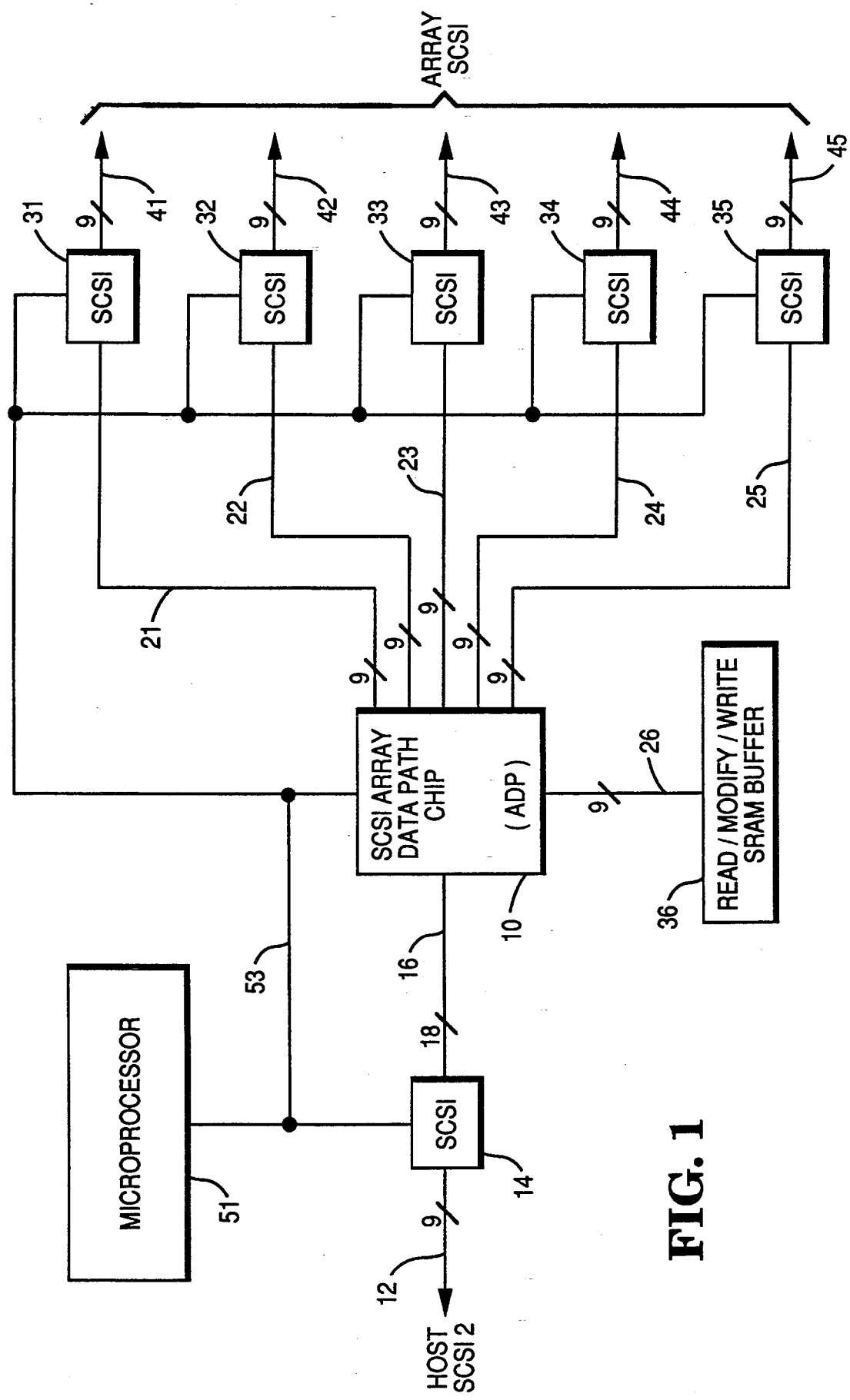
FIG. 1 is a block diagram of a disk array controller incorporating the data and parity routing architecture of the present invention.
Figure 4B:
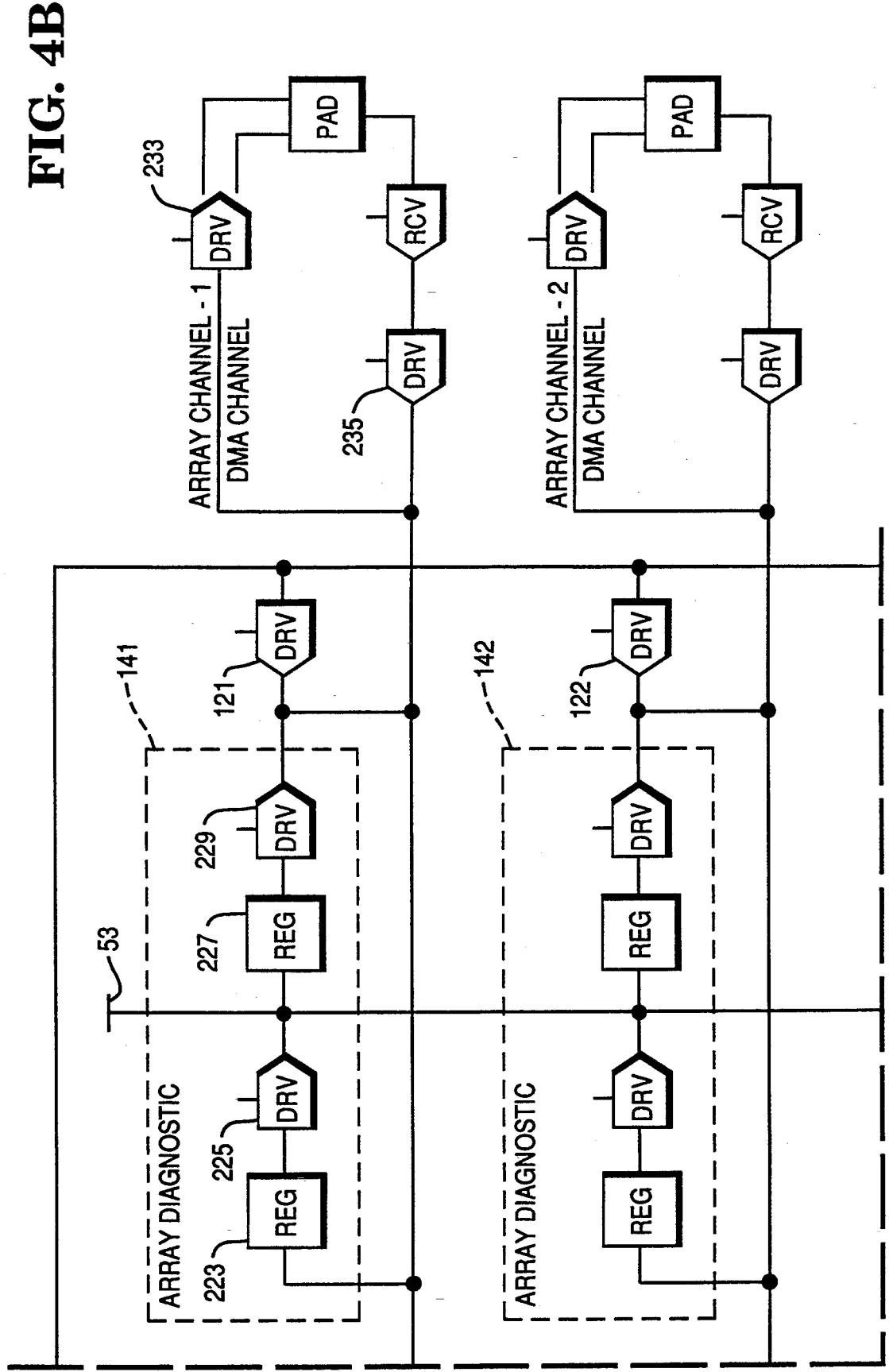
Figure 4C:
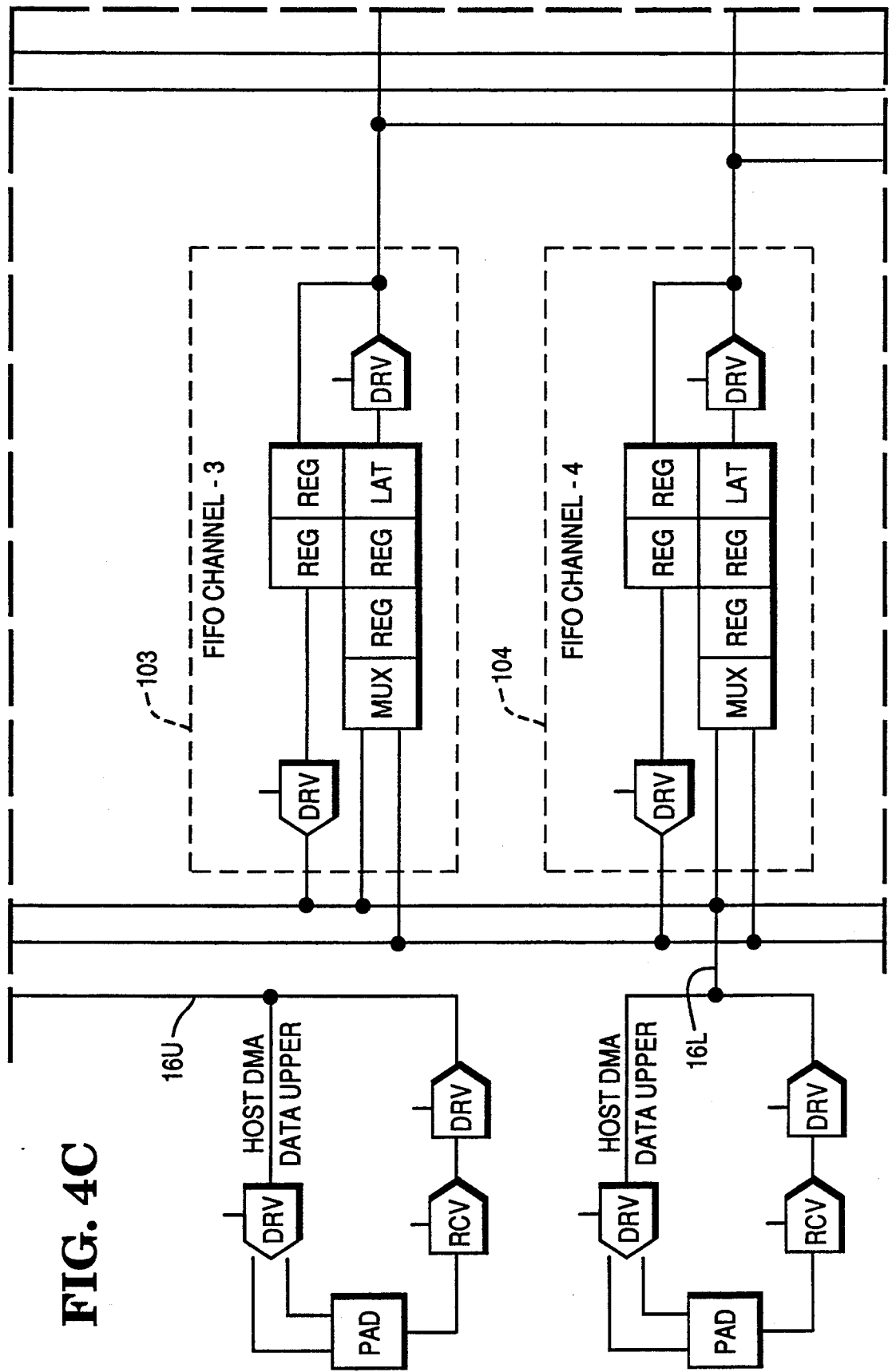
Figure 4D:
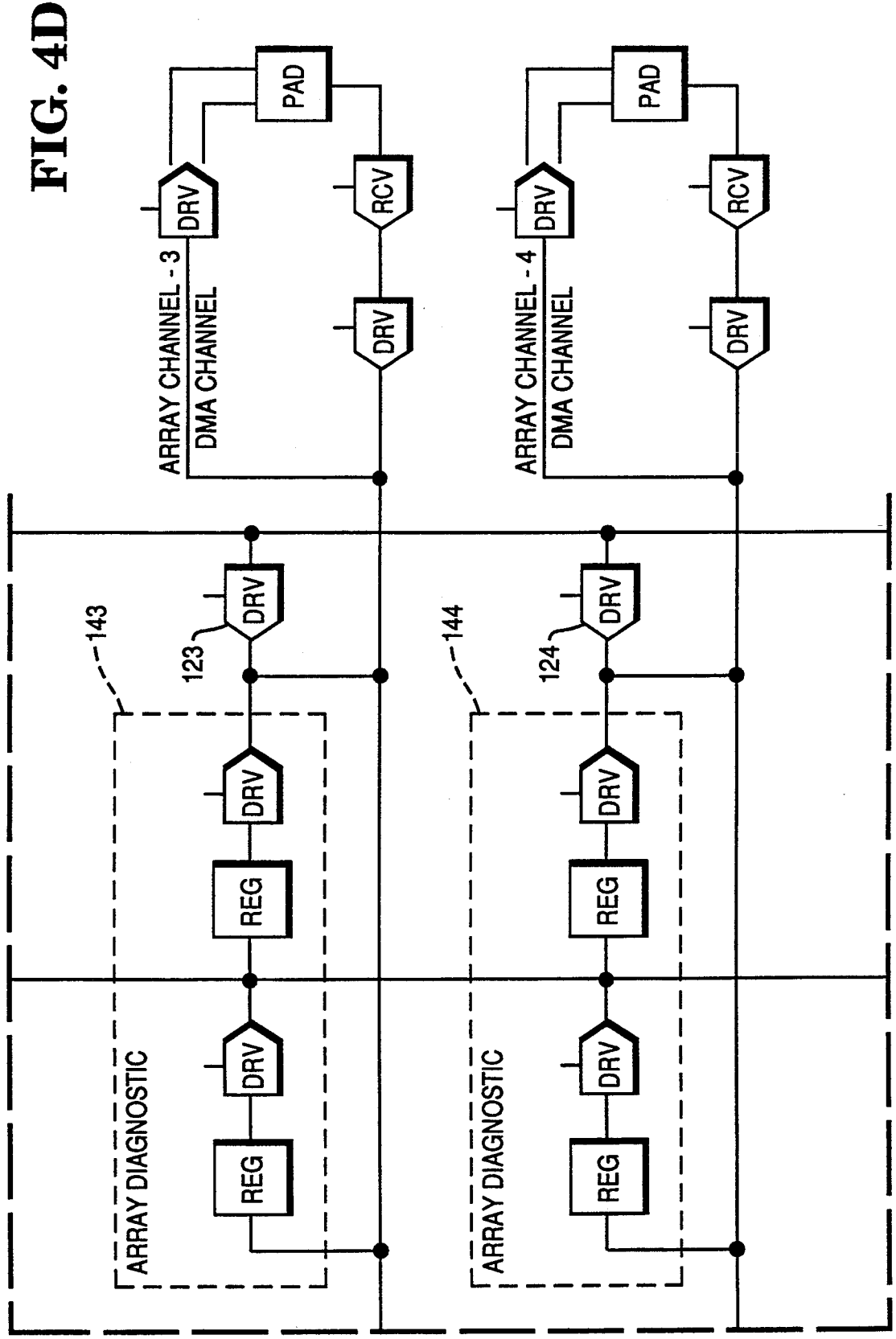
Figures 4, 4E:
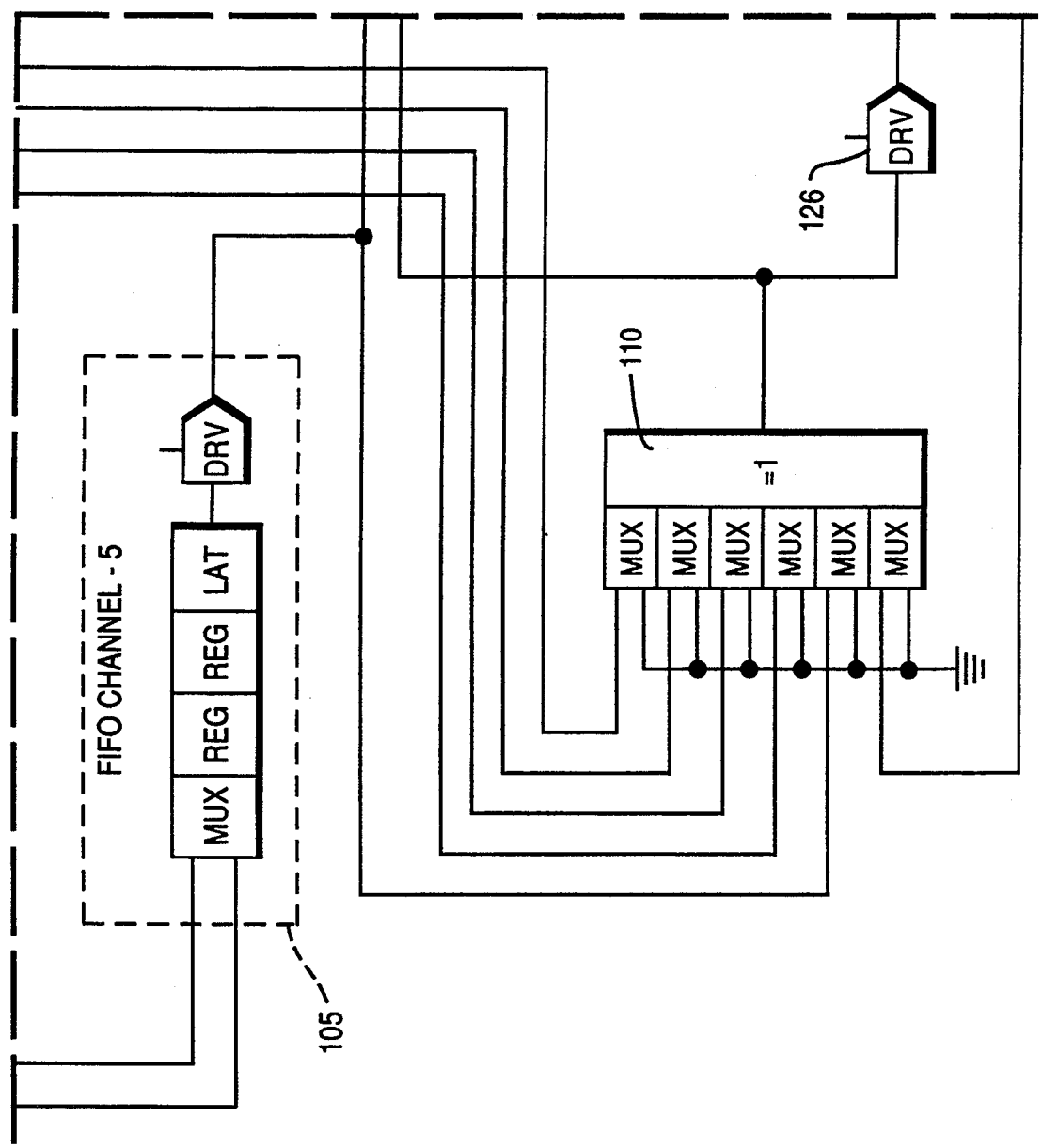
Figure 4F:
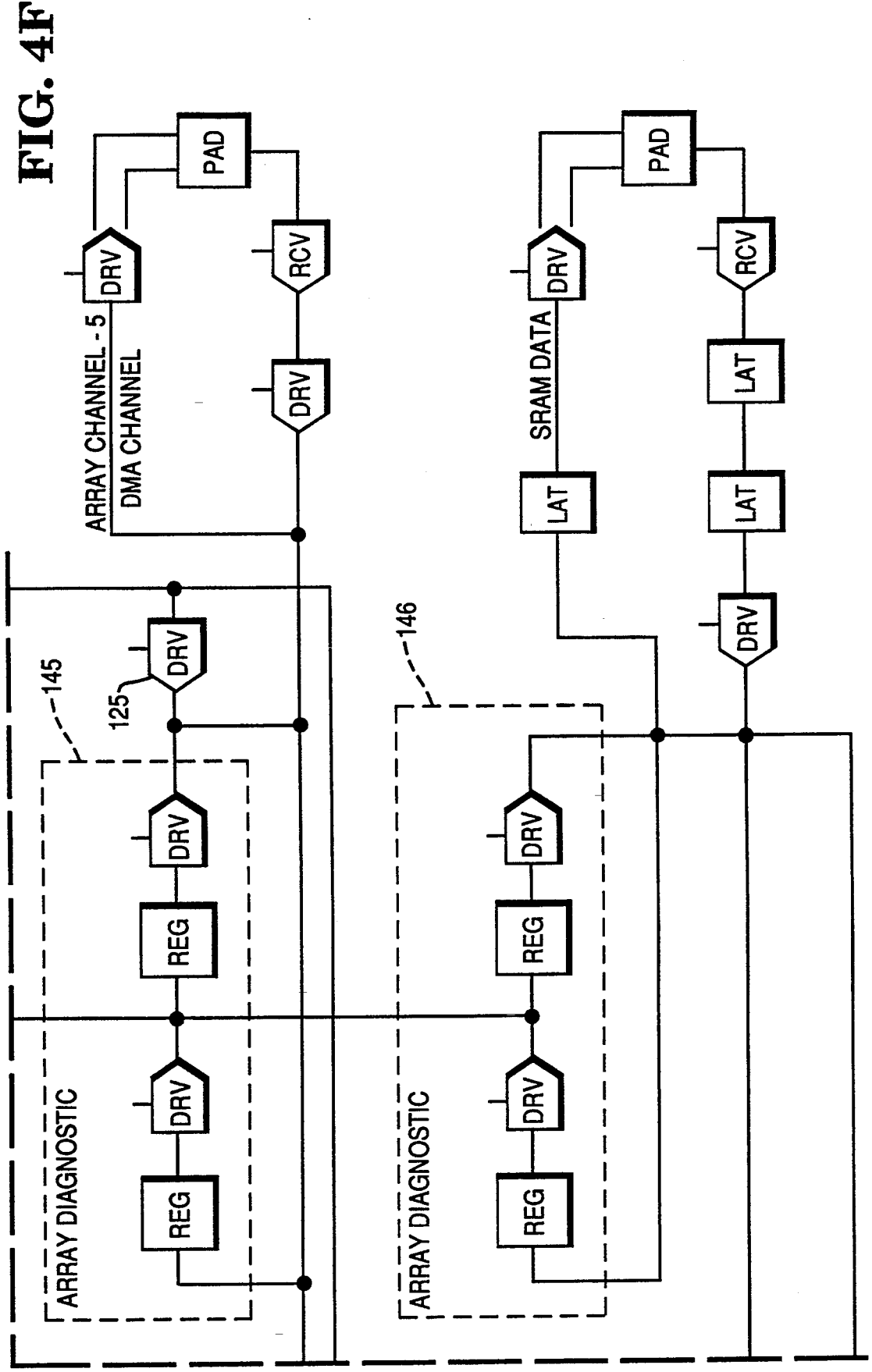

Referring now to FIG. 1, there is seen a block diagram of a SCSI (small computer system interface) disk array controller incorporating the data and parity routing architecture of the present invention. The controller includes a host SCSI adapter 14 to interface between the host system data bus 12 and SCSI data bus 16. Parity generation and data and parity routing are performed within SCSI Array Data Path Chip (ADP) 10. ADP chip 10 interconnects SCSI data bus 16 with six additional data busses, identified by reference numerals 21 through 26. SCSI bus interface chips 31 through 35 interface between respective SCSI data busses 21 through 25 and corresponding external disk drive data busses 41 through 45. Bus 26 connects ADP chip 10 with a 64 kilobyte static random access memory (SRAM) 36. ADP chip 10, SCSI adapter 14 and SCSI bus interface chips 31 through 35 all operate under the control of a dedicated microprocessor 51.

All data busses shown, with the exception of bus 16, include nine data lines, one of which is a parity bit line. Bus 16 includes 16 data data lines, two of which are bus parity lines. Additional control, acknowledge and message lines, not shown, are also included with the data busses.

SCSI adapter 14, SCSI bus interface chips 31 through 36, SRAM 36 and microprocessor 51 are commercially available items. For example, SCSI adapter 14 may be a Fast SCSI 2 chip, SCSI bus interface chips 31 through 35 may be NCR 53C96 chips and microprocessor 51 could be a Motorola MC68020, 16 megahertz microprocessor. Also residing on the microprocessor bus are a one megabyte DRAM, a 128 kilobyte EPROM, an eight kilobyte EEPROM, a 68901 multifunction peripheral controller and various registers.

SCSI data path chip 10 is an application specific integrated circuit device capable of handling all data routing, data multiplexing and demultiplexing, and parity generation and checking aspects of RAID levels 1, 3 and 5. Data multiplexing of non-redundant data among five channels is also accommodated. ADP chip 10 handles the transfer of data between host SCSI adapter 14 and SCSI bus interface chips 31 through 35. The ADP chip also handles the movement of data to and from the 64 kilobyte SRAM during read/modify/write operations of RAID level 5.

FIG. 2 is a functional block diagram of the SCSI Array Data Path Chip (ADP) shown in FIG. 1. The ADP chip consists of the following internal functional blocks: control logic block 60 including diagnostic module 62, configuration control and status register module 64, interrupt module 66 and interface module 68; DMA FIFO block 70; and data and parity routing block 100.

The main function of control block 60 is to configure and to test the data path and parity path described in herein. Microprocessor interface module 68 contains basic microprocessor read and write cycle control logic providing communication and data transfer between microprocessor 51 (shown in FIG. 1) and control and status registers within the control block. This interface utilizes a multiplexed address and data bus standard wherein microprocessor read and write cycles consist of an address phase followed by a data phase. During the address phase a specific register is selected by the microprocessor. During the following data phase, data is written to or read from the addressed register.

Configuration control and status register module 64 includes numerous eight-bit registers under the control of microprocessor interface module 68 as outlined above. The contents of the control registers determine the configuration of the data and parity paths. Status registers provide configuration and interrupt information to the microprocessor.

Diagnostic module 62 includes input and output data registers for the host and each array channel. The input registers are loaded by the processor and provide data to host bus 16, array busses 21 through 25 and SRAM bus 26 to emulate host or array transfers. The output registers, which are loaded with data routed through the various data buses, are read by the microprocessor to verify the proper operation of selected data and parity path configurations.

Interrupt module 66 contains the control logic necessary to implement masking and grouping of ADP chip and disk controller channel interrupt signals. Any combination of five channel interrupt signals received from SCSI bus interface chips 31 through 35 and three internally generated ADP parity error interrupt signals can be combined together to generate interrupt signals for the microprocessor.

The function of DMA FIFO block 70 is to hold data received from the host until the array is ready to accept the data and to convert the data from eighteen bit bus 16 to nine bit busses 18. During read operations DMA FIFO block 70 holds the data received from the disk array until the host system is ready to accept the data and converts the data from nine bit busses 18 to eighteen bit bus 16.

Data and parity routing block 100 contains the steering logic for configuring the data and parity paths between the host, the disk array and SRAM 36 in response to control bytes placed into the control registers contained in module 64. Block 100 also includes logic for generating and checking parity, verifying data, broadcasting data transfers, monitoring data transfers, and reconstructing data lost due to a single disk drive failure.

FIG. 3 is a block diagram of DMA FIFO block 70 and routing block 100 shown in FIG. 2, representing a preferred embodiment of the present invention. The data routing architecture includes five data channels, each channel providing a data path between SCSI adapter 14 and a corresponding one of SCSI bus interface chips 31 through 35. The first data channel includes a double register 101 connected between nine-bit host busses 16U and 16L and array bus 21. Busses 16U and 16L transfer sixteen bits of data and two bits of parity information between external SCSI adapter 14 and double register 101. Array bus 21 connects double register 101 with SCSI bus interface chip 31. Additional taps to array bus 21 will be discussed below. Data channels two through five are similarly constructed, connecting host busses 16U and 16L through respective double registers 102 through 105 and array busses 22 through 25 with SCSI bus interface chips 32 through 35.

Each one of double registers 101 through 105 includes an internal two-to-one multiplexer for selecting as input either one of host busses 16U or 16L when data is to be transferred from busses 16U and 16L to the array busses. Double registers 101 and 102 also each include an internal two-to-one multiplexer for selecting as input either the associated array bus or a parity bus 130 when data is to be transferred to host busses 16U and 16L.

An exclusive-OR circuit 110 is employed to generate parity information from data placed on array busses 21 through 25. A tap is provided between each one of array busses 21 through 25 and a first input of a respective two-to-one multiplexer, the output of which forms an input to exclusive-OR circuit 110. The second inputs of each one of the multiplexers, identified by reference numerals 111 through 115, are connected to ground.

The output of exclusive-OR circuit 110 is provided via nine-bit bus 130 to double registers 101 and 102 and tristate buffers 121, 122, 123, 124, 125 and 126. Each one of tristate buffers 121 through 126, when enabled, provides the parity information generated by exclusive-OR circuit 110 to a respective one of busses 21 through 26. Bus 26 connects the output of tristate buffer 126 with SRAM 36 and one input of a two-to-one multiplexer 116. The output of multiplexer 116 is input to exclusive-OR circuit 110 to provide the architecture with parity checking and data reconstruction capabilities, to be discussed in greater detail below.

Also shown in FIG. 3 are six transceivers, identified by reference numerals 141 through 146, for connecting respective busses 21 through 26 with processor bus 53 for transferring diagnostic information between the array channels and the processor. An additional transceiver 150 connects host busses 16U and 16L with processor bus 53. Transceivers 141 through 146 and 150 allow diagnostic operations by the controller processor.

FIGS. 4A through 4F provide additional detail concerning the construction and operation of double registers 101 through 105, transceivers 141 through 146 and transceiver 150, and control of data to and from SCSI bus interface chips 31 through 35 and SRAM 36.

Double register 101 is seen to include a multiplexer 203 for selecting data from either of busses 16U or 16L for placement into registers 205 and 207, a latch 209 and a buffer/driver 211 for placing the register contents onto array bus 21. Double register 101 further includes a multiplexer 213 for selecting data from either of busses 21 or 130 for placement into registers 215 and 217 and a buffer/driver 219 for placing the content of registers 213 and 215 onto bus 16L. Double register 102 is identical in construction to double register 101 for transferring data from either of busses 16U or 16L to bus 22, and from either of busses 21 or 130 to bus 16U. Double registers 103 and 104 are similar to double registers 101 and 102, respectively, except that neither includes a multiplexer corresponding to multiplexer 213 or a connection to bus 130. Double register 105 includes only those elements described above which are necessary to transfer information from busses 16U and 16L to bus 25.

Each one of transceivers 141 through 146 includes a register 223 connected to receive and store data residing on the associated array or SRAM bus , a buffer/driver 225 connected to provide the contents of register 223 to processor bus 53, a register 227 connected to receive and store data from processor bus 53, and a buffer/driver 229 connected to provide the contents of register 227 to the associated array or SRAM bus. Transceiver 150 includes registers and drivers for storing and transferring data between processor bus 53 and each one of host busses 16U and 16L.

Array busses 21 through 25 each include a pair of parallel-connected buffer/drivers 233 and 235 for controlling the direction of data flow between the array bus and its associated SCSI bus interface chip. SRAM bus 26 is similarly connected with SRAM 36.

Control lines, not shown, are provided between control registers residing in configuration control and status module 64, discussed above, and double registers 101 through 105, multiplexers 111 through 116, tri-state buffers 121 through 126, and transceivers 141 through 146 and 150. Five data path control registers are responsible for configuration of the data path.

Data Path Control Register 1 controls data flow through double registers 101 through 105 during array write operations. Each control register bit controls the operation of one of registers 101 through as identified below.

Data Path Control Register 1

Bit 0—enables register 101
Bit 0—enables register 102
Bit 0—enables register 103
Bit 0—enables register 104
Bit 0—enables register 105
Bit 5—not used
Bit 6—not used
Bit 7—not used When any one of control bits 1 through 5 are set high, data obtained from the host is transferred onto the internal array bus corresponding to the enabled register. The data obtained from the host is thereafter available to the SCSI bus interface chip connected to the array bus, the parity generating logic and to the diagnostic circuitry.

Data Path Control Register 2 controls the operation of multiplexers 111 through 116, thereby governing the input to exclusive-OR circuit 110. Each register bit controls the operation of one of multiplexers 111 through 116 as identified below.

Data Path Control Register 2

Bit 0—selects input to MUX 111
Bit 1—selects input to MUX 112
Bit 2—selects input to MUX 113
Bit 3—selects input to MUX 114
Bit 4—selects input to MUX 115
Bit 5—selects input to MUX 116
Bit 6—not used
Bit 7—not used In the table above, a logic one stored in one or more of register bits 0 through 5 sets the corresponding multiplexer to provide data from its associated array bus to exclusive-OR circuit 110. A logic zero stored in one or more of register bits 0 through 5 selects the corresponding multiplexer input connected to ground.

Data path control register 3 enables and disables the flow of data to or from SCSI bus interface chips 31 through 35 and SRAM 36. The functions of the individual register bits are described below.

Data Path Control Register 3

Bit 0—enable SCSI DMA I/O on channel 1
Bit 1—enable SCSI DMA I/O on channel 2
Bit 2—enable SCSI DMA I/O on channel 3
Bit 3—enable SCSI DMA I/O on channel 4
Bit 4—enable SCSI DMA I/O on channel 5
Bit 5—enable data I/O with SRAM
Bit 6—not used
Bit 7—not used A logic one stored in any one of bits 0 through 5 enables the corresponding channel. Data flow direction to or from SCSI bus interface chips 31 through 35 and SRAM 36 is determined by data path control register 5.

Data path control register 4, through associated chip hardware, enable specific RAID operations as described below.

Data Path Control Register 4

Bit 0—array data transfer direction
Bit 1—RAID level 1 enable
Bit 2—RAID level 4 or 5 enable
Bit 3—RAID level 3 enable
Bit 4—drive configuration 2+1 enable
Bit 5—drive configuration 4+1 enable
Bit 6—array parity checking enable
Bit 7—not used The direction of data flow through the register banks 101 through 105 is determined from the setting of bit 0. This bit is set high for host to array write operations and set low for array to host read operations. Bits 1, 2 and 3 enable the specific RAID operations when set high. Bits 4 and 5 enable the specific RAID level 3 operations when set high. Control bit 6 is set high to enable parity checking.

Data path control register 5 controls the data flow direction to or from SCSI bus interface chips 31 through 35 and SRAM 36.

Data Path Control Register 5

Bit 0—array direction channel 1
Bit 1—array direction channel 2
Bit 2—array direction channel 3
Bit 3—array direction channel 4
Bit 4—array direction channel 5
Bit 5—external SRAM direction
Bit 6—not used
Bit 7—not used A logic one stored in any one of register bits 0 through 5 specifies that data is to transferred from the array channel bus to its connected SCSI bus interface chip or SRAM. A logic 0 sets the data transfer direction from the SCSI bus interface chip or SRAM to the corresponding array channel bus. The control bits of register 3 must be set to enable SCSI bus interface chips 31 through 35 of SRAM 36 to perform a data transfer operation.

The five data path control registers discussed above enable or disable double registers 101 through 105, multiplexers 111 through 116, tri-state buffers 121 through 126, and transceivers 141 through 146 and 150 to configure the architecture to perform the various RAID levels 1, 3, 4 and 5 read and write operations which are described below with reference to FIGS. 5 through 14.

FIG. 5 shows the data path architecture configured to perform RAID level 1 write operations on channels 1 and 2. The contents of data path control registers 1 through 5, expressed in hexadecimal notation, are: control register 1—03 hex, control register 2—00 hex, control register 3—03 hex, control register 4—03 hex, and control register 5—03 hex. Double registers 101 and 102 are thereby enabled to provide data received from the host via busses 16U and 16L to busses 21 and 22. Data is transferred first from bus 16L to busses 21 and 22, and then from bus 16U to busses 21 and 22. SCSI bus interface chips 31 and 32 are enabled to transfer data from busses 21 and 22 to their associated array disks, each disk receiving the same data. Active busses (busses 16U, 16L, 21 and 22) are drawn with greater line weight in FIG. 5. Arrows are provided next to the active busses to indicate the direction of data flow on the busses.

Figure 6:
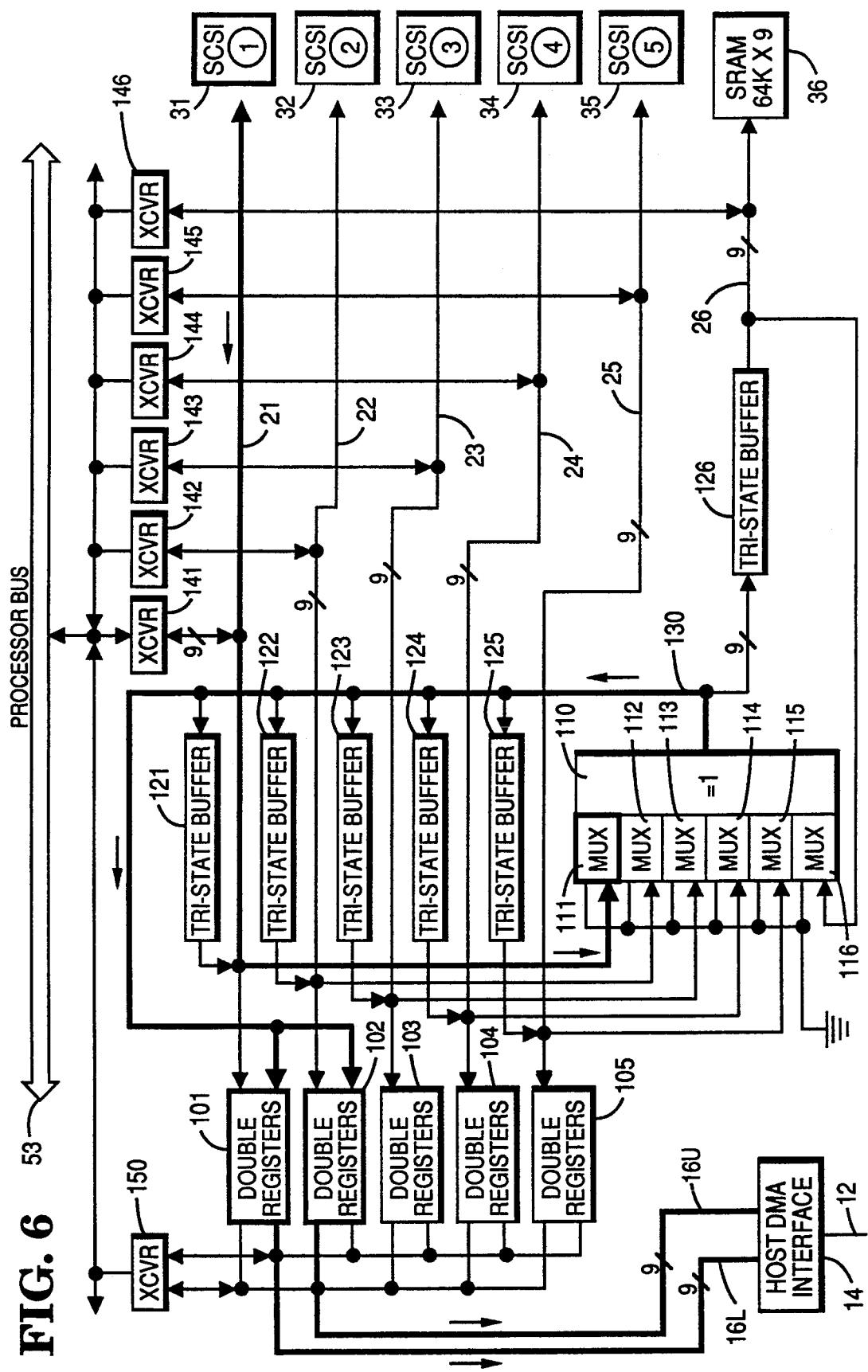

The RAID level 1 read configuration is shown in FIG. 6. As both channel 1 and channel 2 array disks store the same information only one of the disks need be accessed for a RAID level 1 read. To read data from the channel 1 disk data path control register contents are set as follows: control register 1—09 hex, control register 2—01 hex, control register 3—01 hex, control register 4—02 hex, and control register 5—00 hex. SCSI bus interface chip 31 is enabled to provide data from the channel 1 disk to bus 21. Multiplexer 111 is enabled to provide the data on bus 21 through parity generation circuit 110 to bus 130. Since multiplexers 112 through 116 are disabled the data provided to multiplexer 111 passes through the parity generator unaltered. Double registers 101 and 102 are enabled to provide data received from bus 130 to busses 16U and 16L, respectively. Bus 16U is provided with upper byte information while bus 16L transmits lower byte information.

Figure 7:
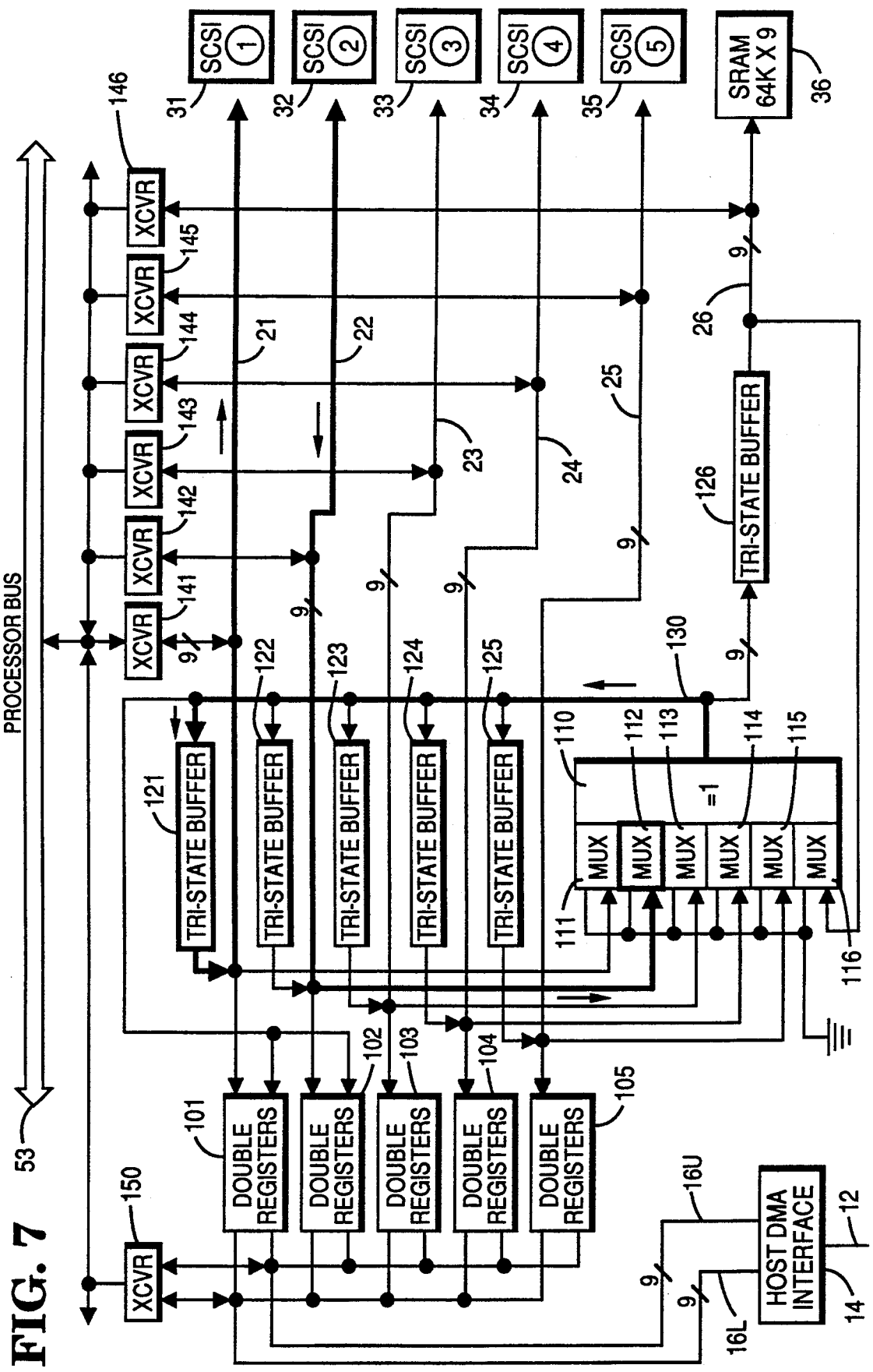

FIG. 7 shows the data path architecture configured to reconstruct the RAID level 1 channel 1 disk from the channel 2 disk. Data path control register contents are set as follows: control register 1—00 hex, control register 2—02 hex, control register 3—03 hex, control register 4—03 hex, and control register 5—01 hex. SCSI bus interface chip 32 is enabled to provide data to bus 22, multiplexer 112 is enabled to provide bus 22 data to bus 130, tristate buffer 121 is enabled to place bus 130 data onto bus 21, and SCSI bus interface chip 31 is enabled to write data received from bus 21 onto the channel 1 disk. The architecture could similarly be configured to reconstruct the channel 2 disk from the channel 1 disk.

Figure 8:
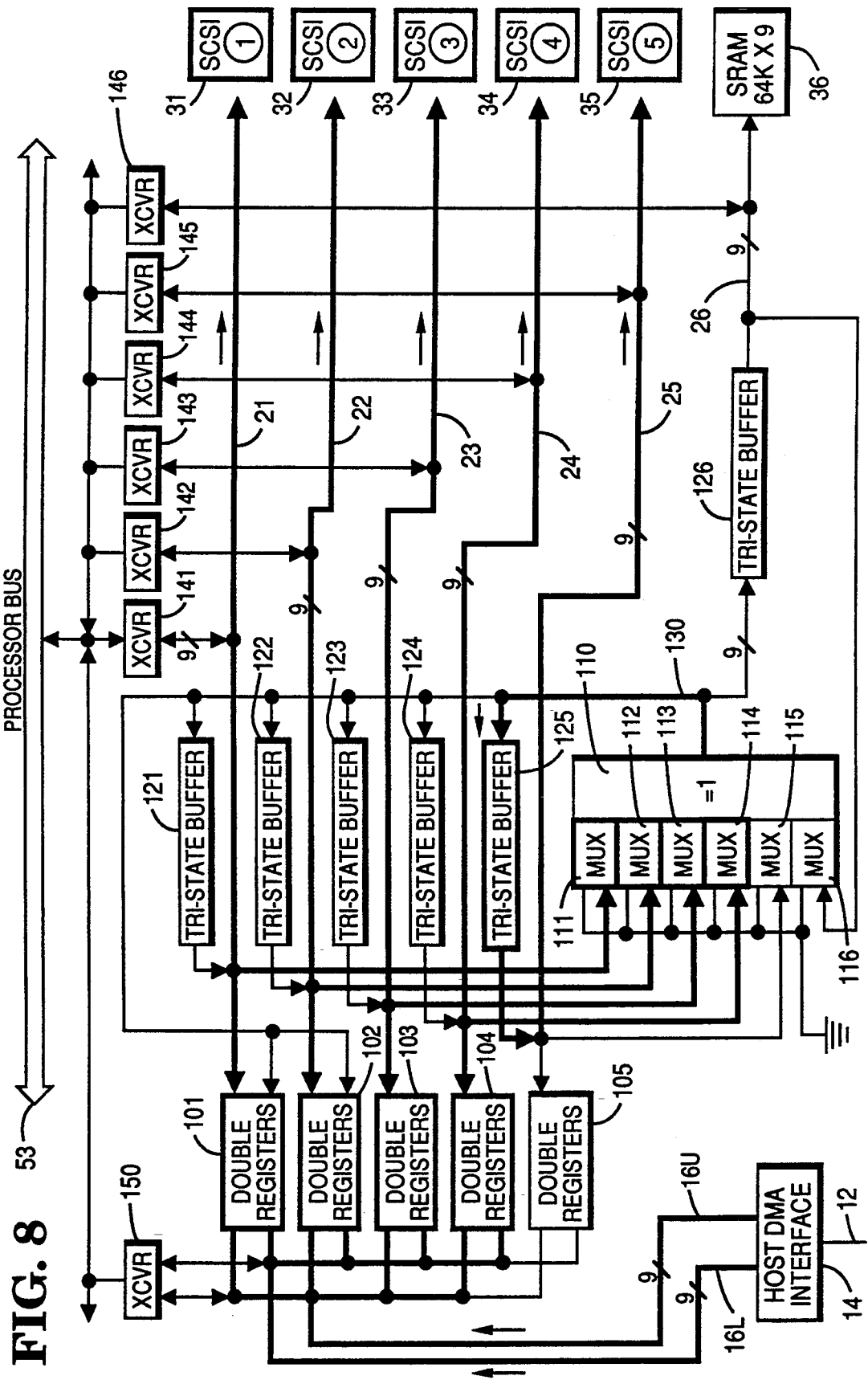

FIG. 8 shows the data path architecture configured to permit RAID level 3, 4+1 (four data disks and one parity disk) write operations. The contents of the data path control registers are: control register 1—0 Fhex, control register 2—0 Fhex, control register 3—1 Fhex, control register 4—29 hex, and control register 5—1 Fhex. Double registers 101 through 104 are enabled to provide data from the host to busses 21 through 24, respectively. Multiplexers 111 through 114 are enabled to provide data from busses 21 through 24 to parity generator 110, the output of which is provided via bus 130, enabled tri-state buffer 125, and bus 25 to bus interface 35. Bus interface chips 31 through 35 are enabled to provide data from busses 21 through 25 to their corresponding array disks.

Figure 9:
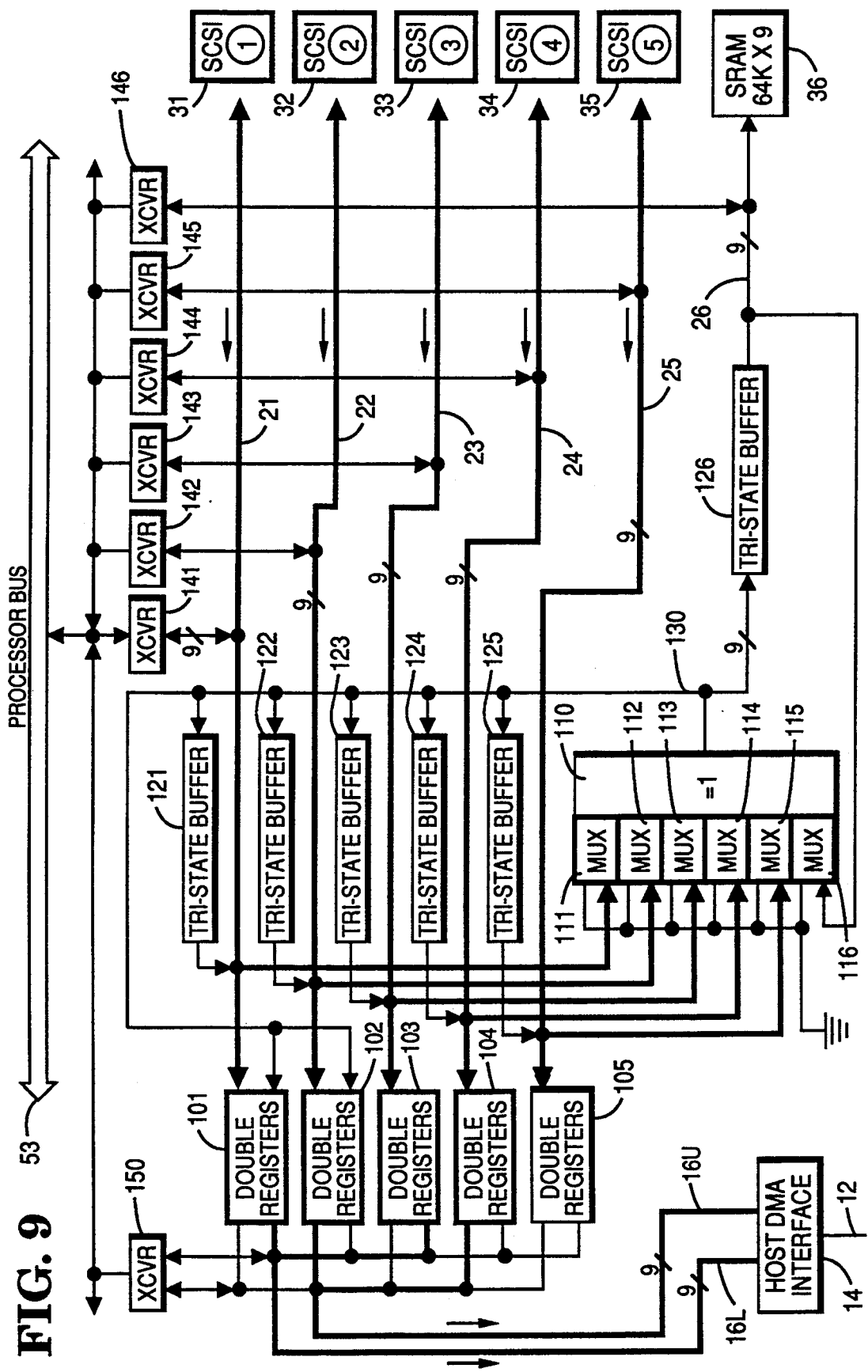

The RAID level 3 read configuration is illustrated in FIG. 9 where SCSI bus interface chips 31 through 34 are enabled to provide data from their corresponding array disks to double registers 101 through 104 via busses 21 through 25. Double registers 101 through 104 are enabled to provide the data received from busses 21 through 24 to busses 16U and 16L. The data path control registers are set as follows to configure the data paths: control register 1—00 hex, control register 2—1 Fhex, control register 3—1 Fhex, control register 4—68 hex, and control register 5—00 hex. Parity checking is performed by exclusive-ORing the parity information stored on the channel 5 disk with the data read from the channel 1 through 4 disks. The output of parity generator 110 should be 00 hex if the stored data is retrieved from the array without error.

Figure 10:
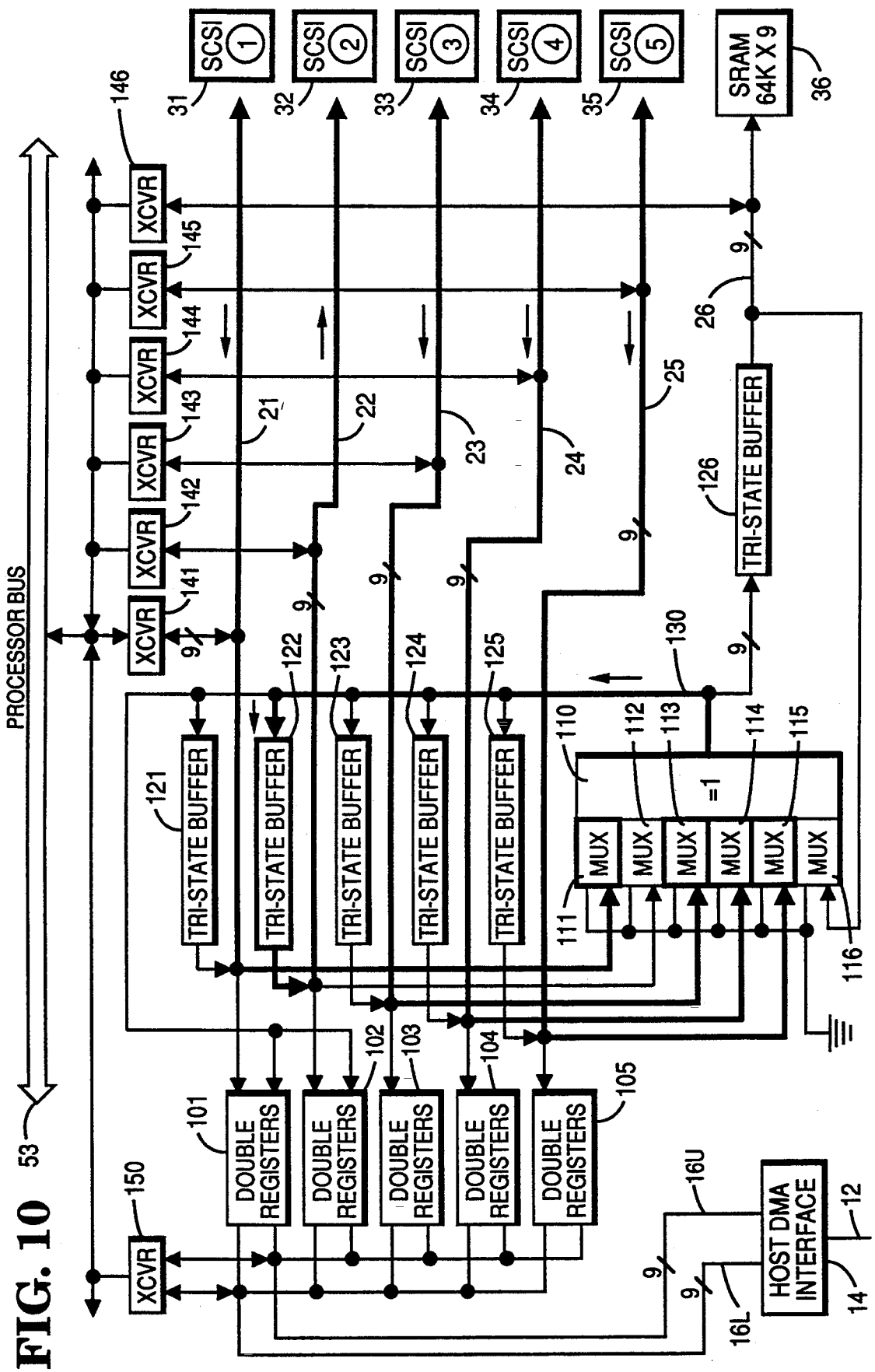

FIG. 10 shows the data path architecture configured to reconstruct the RAID level 3 channel 2 disk from the remaining data and parity disks. Data path control register contents are set as follows: control register 1—00 hex, control register 2—1 Dhex, control register 3—1 Fhex, control register 4—29 hex, and control register 5—02 hex. SCSI bus interface chips 31, 33, 34 and 35 and multiplexers 111, 113, 114 and 115 are enabled to provide data and parity information from the channel 1, 3, 4 and 5 array disks to parity generator 130. Parity generator 130 combines the received data and parity information to regenerate channel 2 data. The output of the parity generator is provided to the channel 2 disk through bus 130, enabled tristate device 122, bus 22 and enabled bus interface chip 32. Alternatively, the architecture could be configured to provide the reconstructed data directly to the host during read operations.

Figure 11:
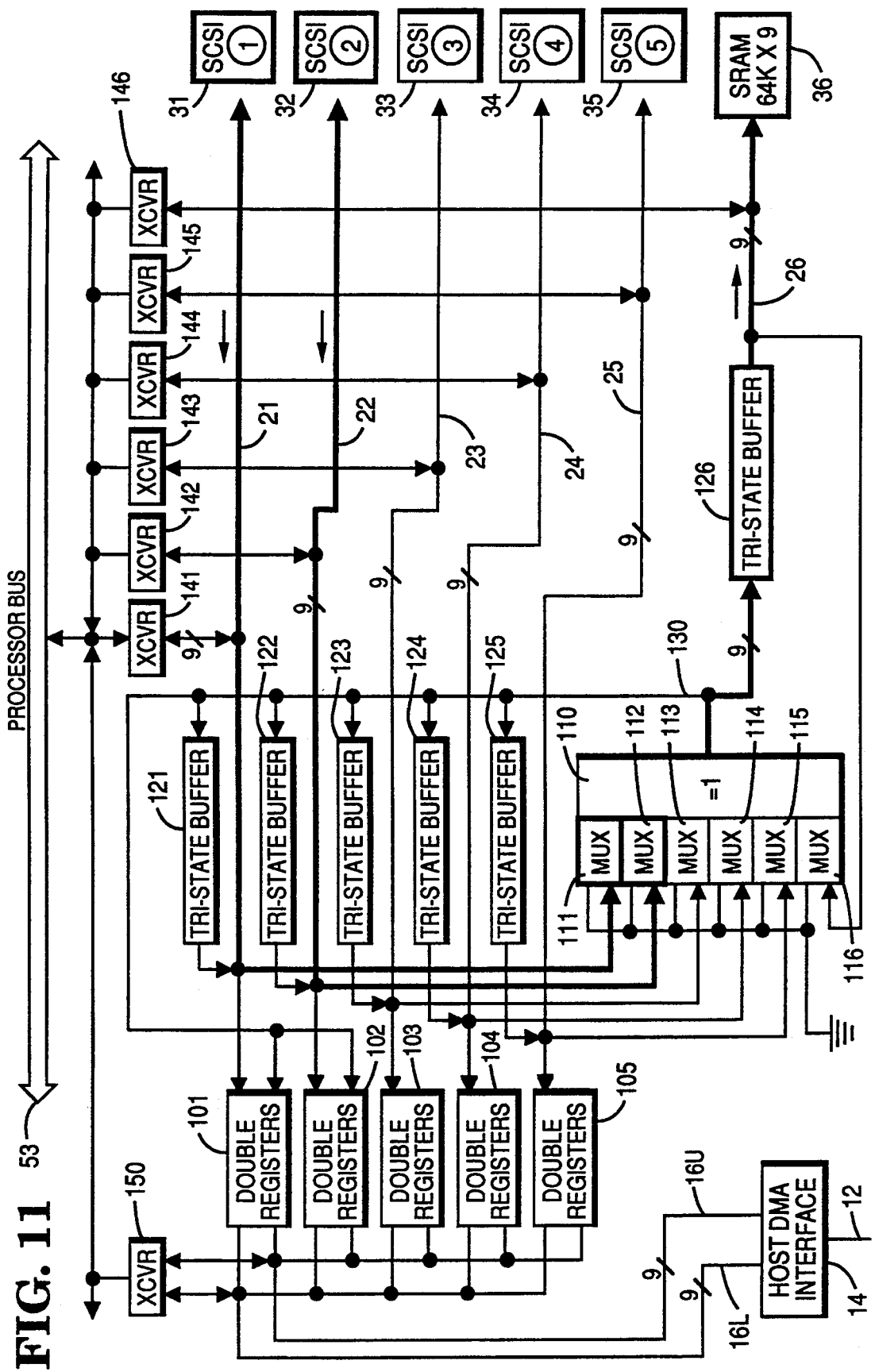
Figure 12:
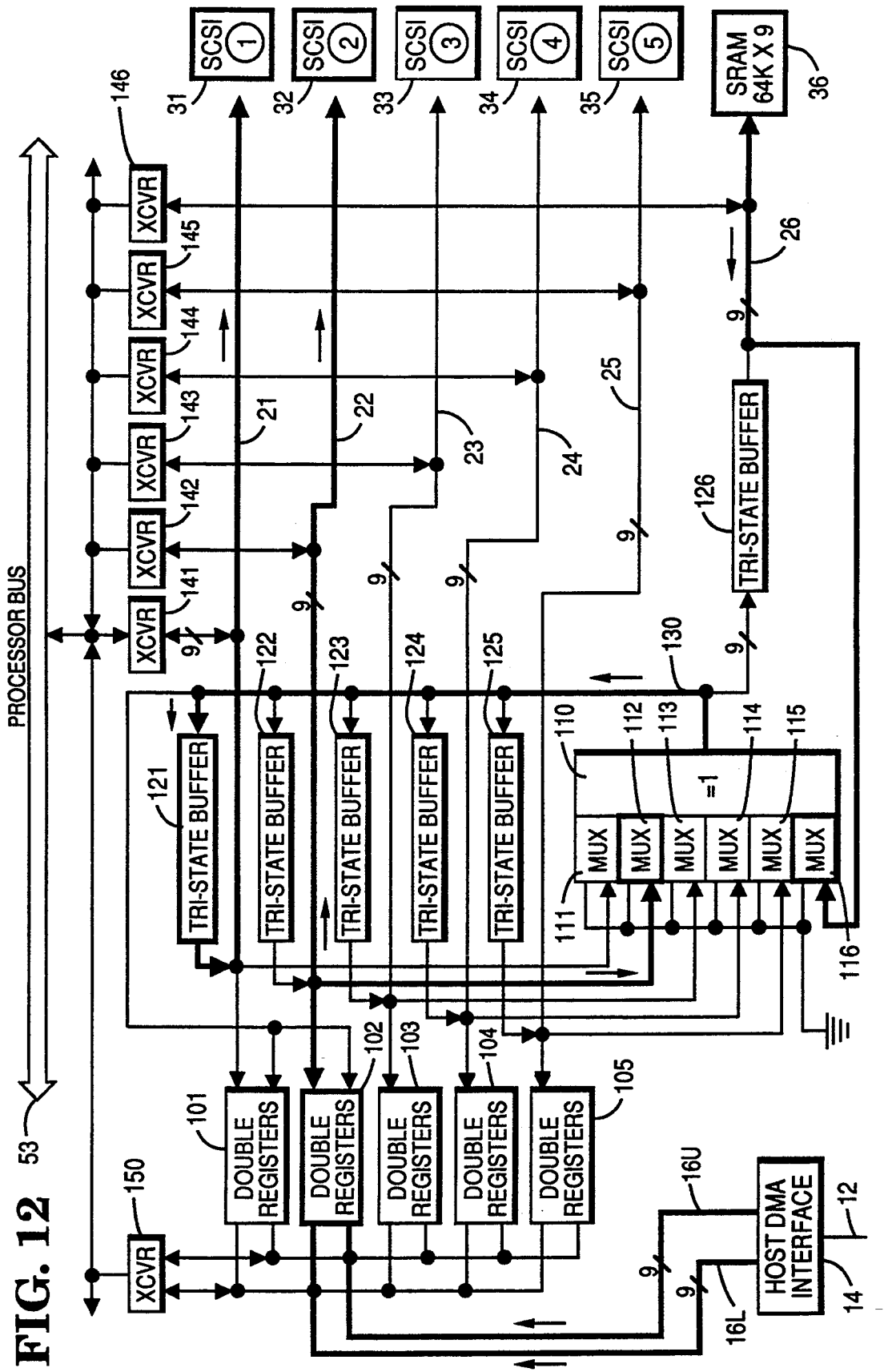

RAID level 5 write operations involve both a read and a write procedure. FIGS. 11 and 12 illustrate a RAID level 5 write involving the channel 1 and 2 array disks, wherein data is to be written to the channel 2 array disk and parity information is to be updated on the channel 1 disk. The data paths are first configured as shown in FIG. 11 to read information from the channel 1 and 2 disks. This information is provided through multiplexers 111 and 112 to parity generator 110 and the result stored in external SRAM 36 via bus 130, enabled tri-state buffer 136 and bus 26. The data path control registers contain the following codes: control register 1—00 hex, control register 2—03 hex, control register 3—23 hex, control register 4—04 hex, and control register 5—20 hex.

New data and parity information is then written to the channel 1 and 2 array disks as shown in FIG. 12. Double register 102 is enabled to receive the new data from the host and provide the data to the channel 2 disk via bus 22 and enabled SCSI bus interface chip 32. The new data is also provided to parity generator 110 through multiplexer 112. The information previously written into SRAM 36 is also provided to parity generator 110 through multiplexer 116. The output of the parity generator is the new parity which is provided through enabled tri-state buffer 121, bus 21 and enabled SCSI bus interface chip 31 to the channel 1 disk. The contents of the data path control registers for the second portion of the RAID level 5 write operation are as follows: control register 1—02 hex, control register 2—22 hex, control register 3—23 hex, control register 4—05 hex, and control register 5—03 hex.

Figure 13:
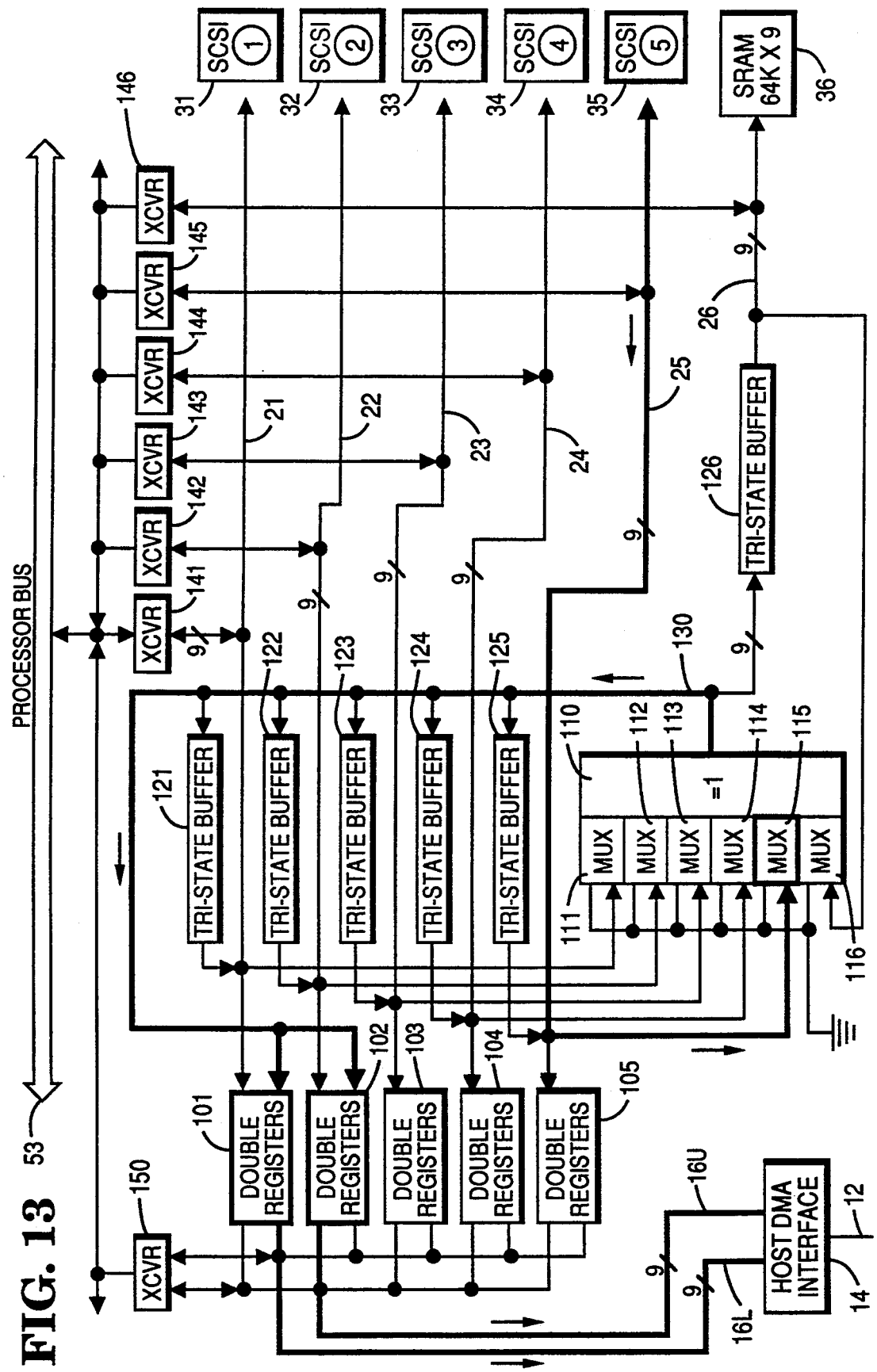

FIG. 13 illustrates a RAID level 5 read operation. In this example the information to be read resides on the channel 5 array disk. The data path control registers are set to enable SCSI bus interface chip 35, multiplexer 115, and double registers 101 and 102 to transfer data from the channel 5 disk to the host. Control register contents are: control register 1—00 hex, control register 2—10 hex, control register 3—10 hex, control register 4—04 hex, and control register 5—00 hex.

Figure 14:
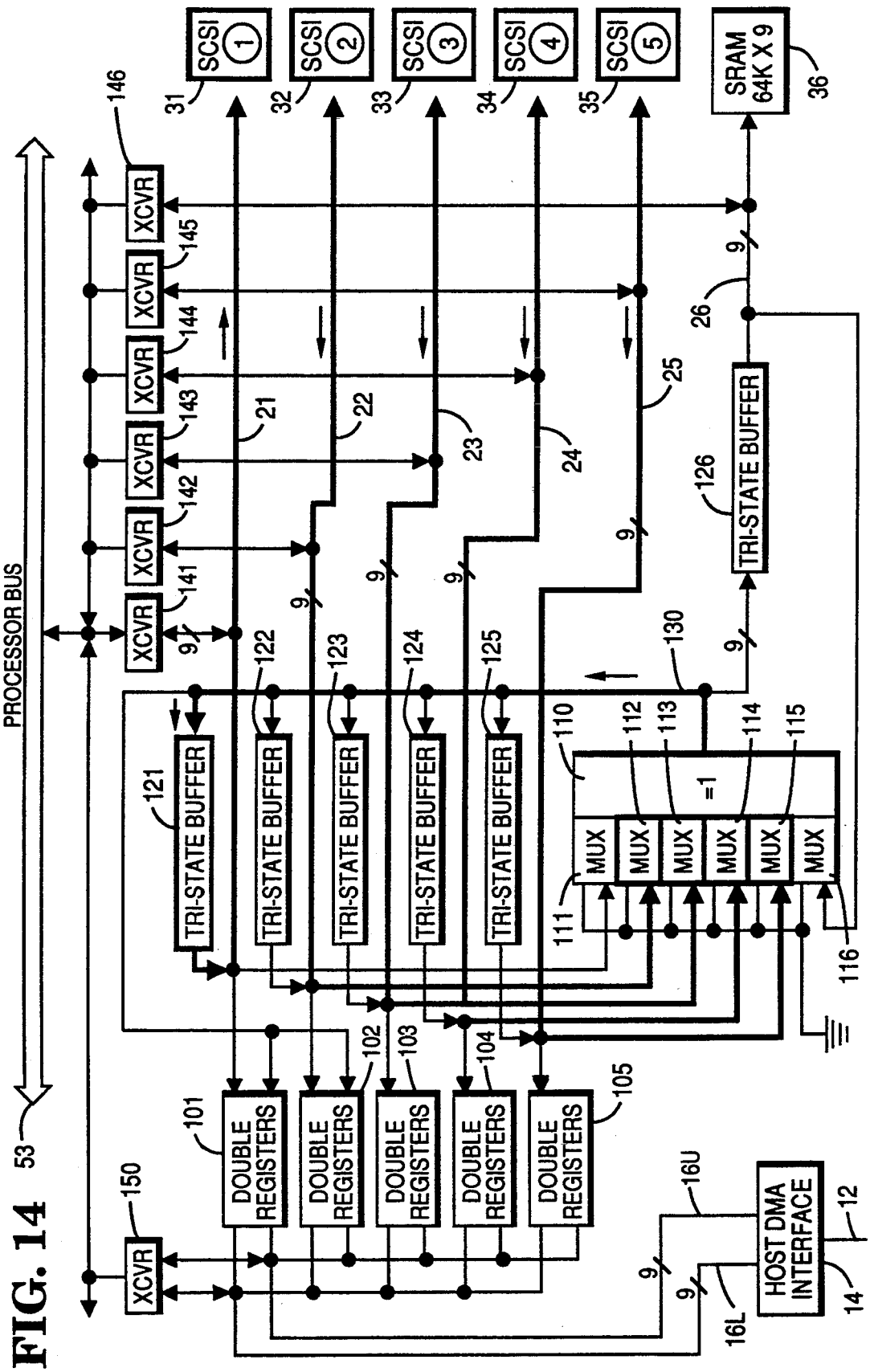

RAID level 5 disk reconstruction is similar to RAID level 3 disk reconstruction discussed above in connection with FIG. 9. FIG. 14 depicts a configuration for reconstructing data on channel 2. The data path control register contents are: control register 1—00 hex, control register 2—1 Dhex, control register 3—1 Fhex, control register 4—25 hex, and control register 5—02 hex.

The data path architecture may also be configured to perform data verification, data broadcasting, and diagnostic operations. Additional control registers are provided to control transceivers 141 through 146 and transceiver 150 to configure the architecture to perform these additional operations. FIGS. 15 through 18 illustrate a few of the data verification, data broadcasting, and diagnostic operations which can be accomplished.

Figure 15:
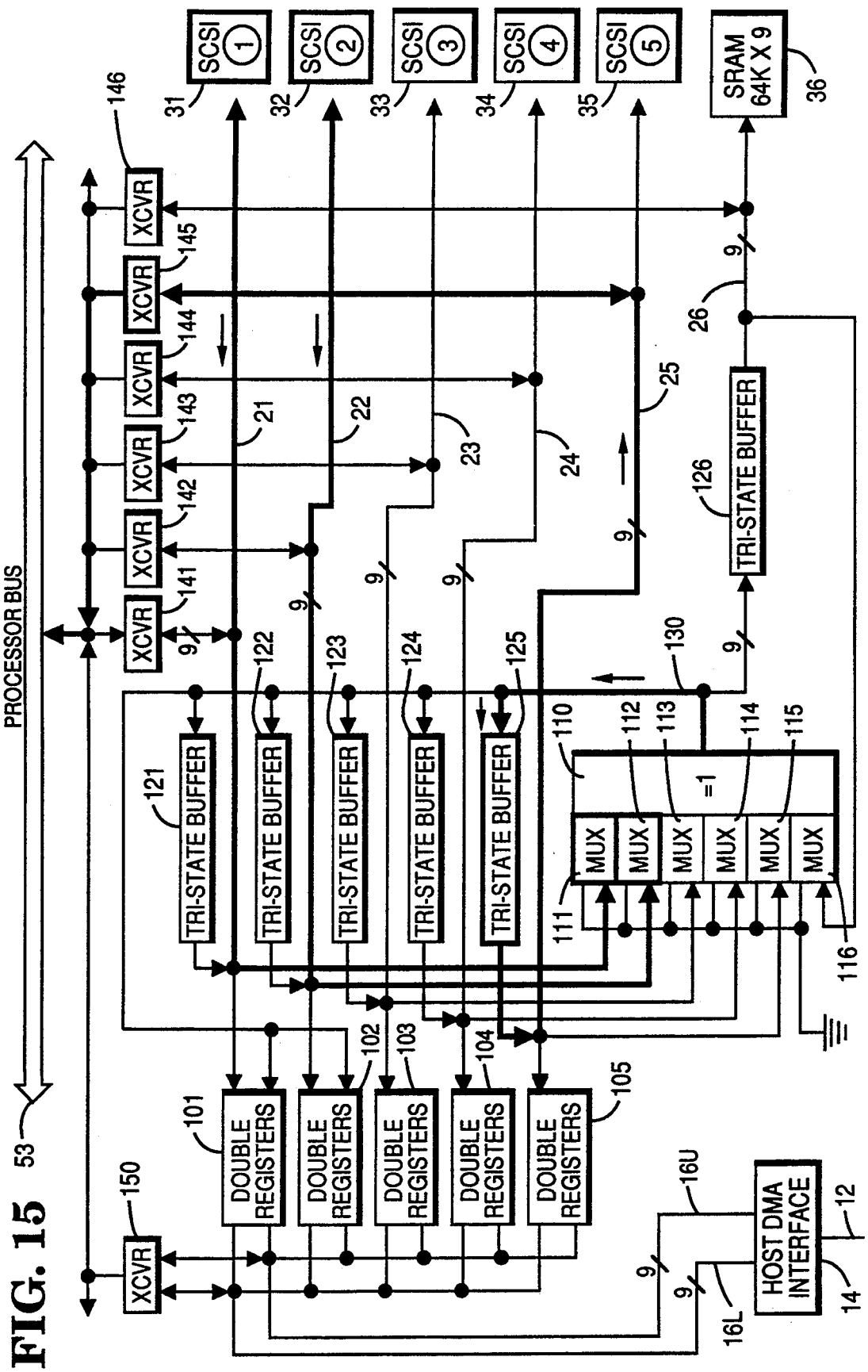

FIG. 15 shows the data path architecture configured to verify that information stored on channel 1 and 2 array disks in accordance with RAID level 1 is correct. Channels 1 and 2 are enabled to receive data from SCSI bus interface chips 31 and 32. Multiplexers 111 and 112 are enabled to provide this data to the exclusive-OR circuit 110. The output of circuit 110, which should be 00 hex if the channel 1 and 2 disks contain duplicate information, is provided through bus 130, enabled tri-state buffer 125, bus 25, enabled transceiver 145 and bus 53 to the processor for evaluation.

Figure 16:
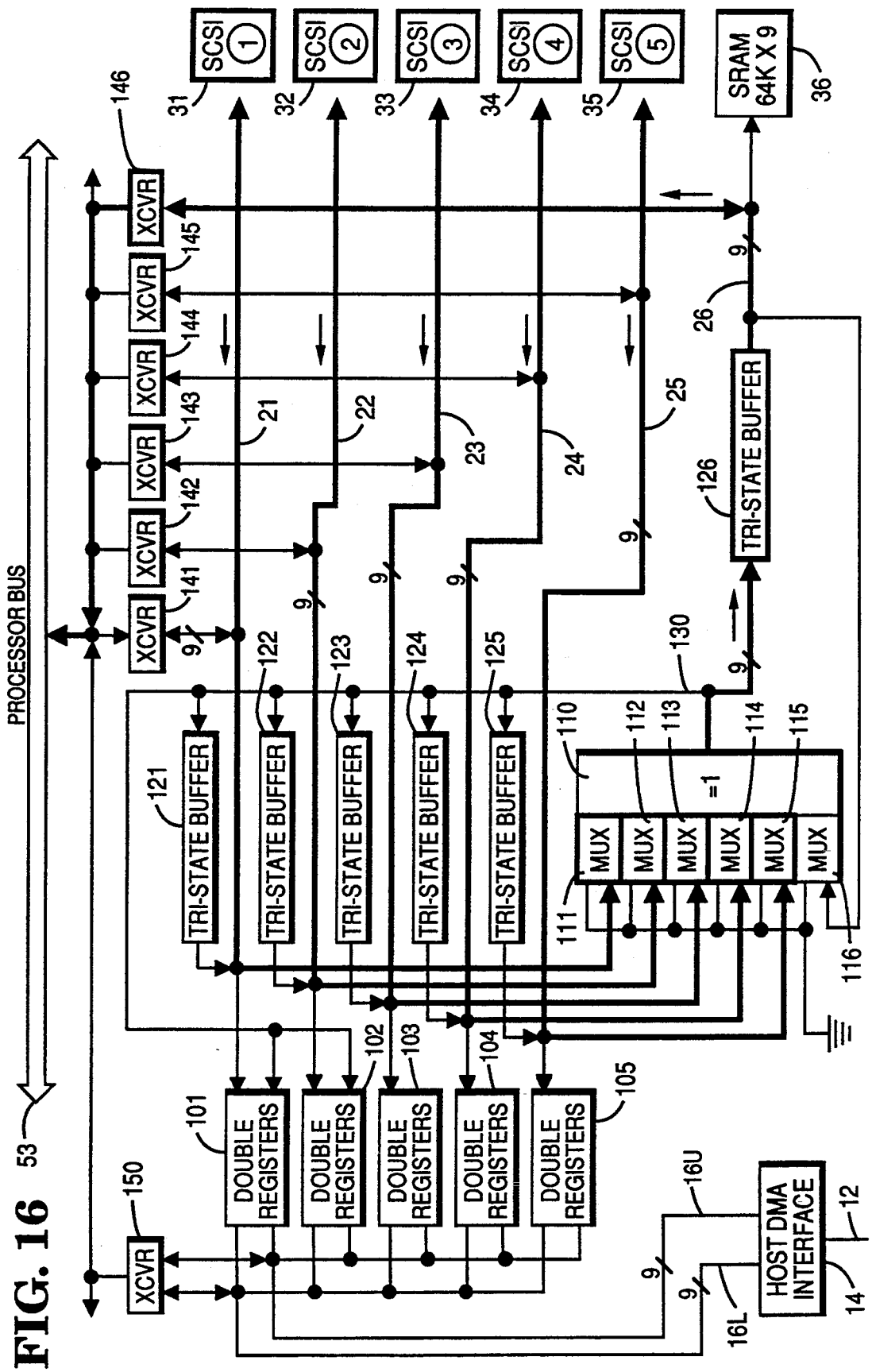

FIG. 16 illustrates the data path architecture configured to verify that information stored in the array in accordance with RAID levels 3 or 5, is correct. Channels 1 through 5 are enabled to receive data from SCSI bus interface chips 31 through 35. Multiplexers 111 through 115 are enabled to provide this data to the exclusive-OR circuit 110. The output of circuit 110, which should be 00 hex if the data and parity information are in agreement, is provided through bus 130, enabled tri-state buffer 126, bus 26 and enabled transceiver 146 to the processor for evaluation.

Figure 17:
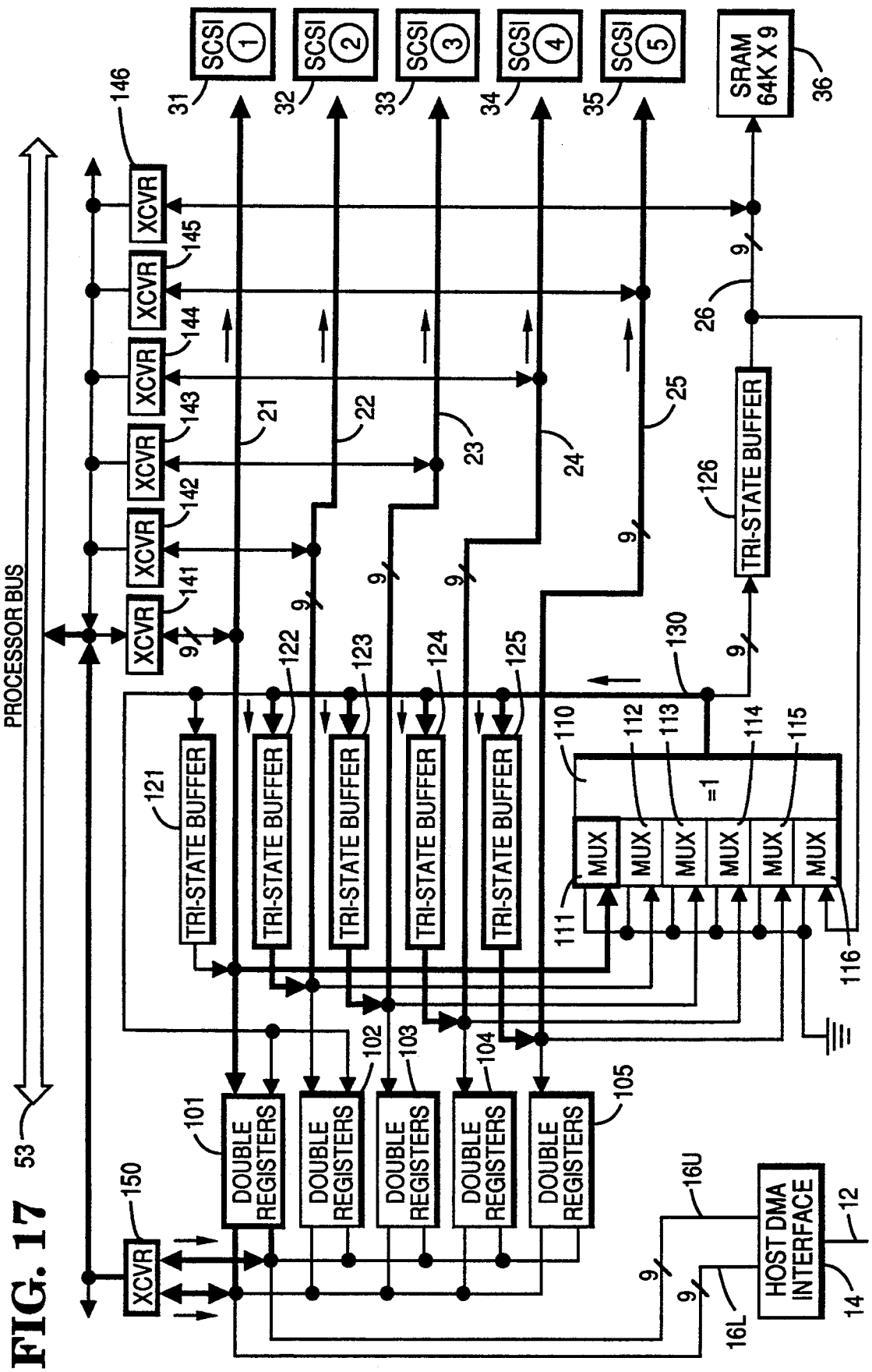

FIGS. 17 and 18 show the data path architecture configured for data broadcasting wherein the same data is written to each of the disks in the array. Data broadcasting may be performed to initialize all the array disks with a known data pattern. In FIG. 17 data is received by double register 101 from the processor via bus 53 and enabled transceiver 150. In FIG. 18 data is provided to double register 101 by the host system. In both cases double register 101 is enabled to provide the received data to SCSI bus interface chips 31 via bus 21. Multiplexer 111 is enabled to provide bus 21 data to exclusive-OR circuit 110. Multiplexers 112 through 116 remain disabled so that the output of circuit 110 is equivalent to the data received from bus 21. Tristate devices 112 through 115 are enabled to provide the output of circuit 110 to SCSI bus interface chips 32 through 35.

It can thus be seen that there has been provided by the present invention a versatile data path and parity path architecture for controlling data flow between a host system and disk array. Those skilled in the art will recognize that the invention is not limited to the specific embodiments described above and that numerous modifications and changes are possible without departing from the scope of the present invention. For example, the architecture need not be limited to five channels. In addition, configurations other than those described above are possible. Processors, processor interfaces, and bus interfaces other than the types shown in the Figures and discussed above can be employed. For example, the data path architecture can be constructed with ESDI, IPI or EISA devices rather than SCSI devices.

These and other variations, changes, substitution and equivalents will be readily apparent to those skilled in the art without departing from the spirit and scope of the present invention. Accordingly, it is intended that the invention to be secured by Letters Patent be limited only by the scope of the appended claims.

What is claimed is:

1. Apparatus for coupling a host with an array of disk drives, said apparatus comprising:
   a host bus;
   a plurality of array busses;
   means for connecting said host bus with a first group of selected array busses; said means comprising:
      a plurality of registers corresponding to said plurality of array busses, each one of said plurality of registers being connected to said host bus for receiving data therefrom; and
      a plurality of bus drivers corresponding to said plurality of registers, each one of said plurality of bus drivers being connected between its corresponding register and the array bus corresponding thereto and having an enable input connected to receive a control signal, each one of said plurality of bus drivers being responsive to said control signal to provide the contents of its corresponding register to the array bus corresponding thereto;
   a parity generation circuit having an input and an output;
   means for connecting a second group of selected array busses to the input of said parity generation circuit; and
   means for connecting the output of said parity generation circuit to a third group of selected array busses.

2. The apparatus according to claim 1, wherein said parity generation circuit comprises an exclusive-OR circuit having an output.

3. The apparatus according to claim 2, further comprising means for connecting the output of said exclusive-OR circuit to said host bus.

4. Apparatus for coupling a host with an array of disk drives, said apparatus comprising:
   a host bus;
   a plurality of array busses;
   means for connecting said host bus with a first group of selected array busses;
   a parity generation circuit having an input and an output, said parity generation circuit comprising an exclusive-OR circuit having an output;
   means for connecting a second group of selected array busses to the input of said parity generation circuit; said means for connecting a second group of selected array busses to the input of said parity generation circuit comprising a plurality of multiplexers corresponding to said plurality of array busses, each one of said plurality of multiplexers having a first input connected to its corresponding array bus, a second input connected to a logic zero voltage source, an output connected to said exclusive-OR circuit and a select input connected to receive a control signal, each one of said plurality of multiplexers being responsive to said control signal to connect its corresponding array bus with said exclusive-OR circuit; and
   means for connecting the output of said parity generation circuit to a third group of selected array busses.

5. Apparatus for coupling a host with an array of disk drives, said apparatus comprising:
   a host bus;
   a plurality of array busses;
   means for connecting said host bus with a first group of selected array busses;
   a parity generation circuit having an input and an output, said parity generation circuit comprising an exclusive-OR circuit having an output;
   means for connecting a second group of selected array busses to the input of said parity generation circuit; and
   means for connecting the output of said parity generation circuit to a third group of selected array busses, said means for connecting the output of said parity generation circuit to a third group of selected array busses comprising a plurality of bus drivers corresponding to said plurality of array busses, each one of said plurality of bus drivers being connected to the output of said exclusive-OR circuit and its corresponding array bus and having an enable input connected to receive a control signal, each one of second plurality of bus drivers being responsive to said control signal to connect the output of said exclusive-OR circuit to its corresponding array bus.

6. Apparatus for coupling a host with an array of disk drives, said apparatus comprising:
a host bus;
a plurality of array busses;
means for connecting said host bus with a first group of selected array busses;
a parity generation circuit having an input and an output, said parity generation circuit comprising an exclusive-OR circuit having an output;
means for connecting a second group of selected array busses to the input of said parity generation circuit; and
means for connecting the output of said parity generation circuit to a third group of selected array busses;
temporary storage means;
means for connecting the output of said exclusive-OR circuit with said temporary storage means, said means for connecting the output of said exclusive-OR circuit with said temporary storage means comprising a first bus driver connected between the output of said exclusive-OR circuit and said temporary storage means and having an enable input connected to receive a first control signal, said first bus drive being responsive to said first control signal to provide the output of said exclusive-OR circuit to said temporary storage means; and
means for connecting said temporary storage means to an input of said exclusive-OR circuit, said means for connecting said temporary storage means to an input of said exclusive-OR circuit comprising a second bus drive connected between said temporary storage means and the input to said exclusive-OR circuit and having an enable input connected to receive a second control signal, said bus driver being responsive to said second control signal to provide the contents of said temporary storage means to said exclusive-OR circuit.

7. Apparatus for coupling a host with an array of disk drives, said apparatus comprising:
a host bus;
a plurality of array busses;
means for connecting said host bus with a first group of selected array busses;
a parity generation circuit having an input and an output;
means for connecting a second group of selected array busses to the input of said parity generation circuit;
means for connecting the output of said parity generation circuit to a third group of selected array busses;
a diagnostic bus;
means for connecting the diagnostic bus with a fourth group of selected array busses; and means for connecting said diagnostic bus with said host bus.

8. Apparatus for transferring data between a host bus and a plurality of disk drives, said apparatus comprising:
an exclusive-OR circuit having an output; and
a plurality of array channels corresponding to said plurality of disk drives, each of said plurality of array channels comprising:
an array bus;
a register connected to said host bus for receiving data therefrom;
a first bus driver connected between said register and said array bus and having an enable input connected to receive a first control signal, said bus driver being responsive to said first control signal to provide the contents of said register to said array bus;
a multiplexer having a first input connected to said array bus, a second input connected to a logic zero voltage source, an output connected to said exclusive-OR circuit and a select input connected to receive a second control signal, said multiplexer being responsive to said second control signal to connect said array bus with said exclusive-OR circuit; and
a second bus driver connected between the output of said exclusive-OR circuit and said array bus and having an enable input connected to receive a third control signal, said bus driver being responsive to said third control signal to provide the output of said exclusive-OR circuit to said array bus.

9. The apparatus according to claim 8, wherein each of said array channels further includes:
a second register connected to said array channel for receiving data therefrom; and
a third bus drive connected between said register and said host bus and having an enable input connected to receive a fourth control signal, said third bus driver being responsive to said fourth control signal to provide the contents of said second register to said host bus.

10. The apparatus according to claim 9, further comprising:
temporary storage means;
a fourth bus driver connected between the output of said exclusive-OR circuit and said temporary storage means and having an enable input connected to receive a fifth control signal, said fourth bus driver being responsive to said fifth control signal to provide the output of said exclusive-OR circuit to said temporary storage means; and
a fifth bus driver connected between said temporary storage means and an input to said exclusive-OR circuit and having an enable input connected to receive a sixth control signal, said fifth bus driver being responsive to said sixth control signal to provide the contents of said temporary storage means to said exclusive-OR circuit.

* * * * *